United States Patent
Takubo

(10) Patent No.: US 8,000,703 B2
(45) Date of Patent: Aug. 16, 2011

(54) METHOD OF REGISTERING LOCATION OF MOBILE-COMMUNICATION SYSTEM AND DEVICE THEREFOR

(75) Inventor: Hiroshi Takubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 850 days.

(21) Appl. No.: 12/007,094

(22) Filed: Jan. 7, 2008

(65) Prior Publication Data

US 2008/0171545 A1    Jul. 17, 2008

(30) Foreign Application Priority Data

Jan. 17, 2007  (JP) ................................. 2007-007921

(51) Int. Cl.
*H04W 4/00*    (2009.01)
(52) U.S. Cl. ........................................................ 455/433
(58) Field of Classification Search .................... 455/433
See application file for complete search history.

(56) References Cited

U.S. PATENT DOCUMENTS

| | | | |
|---|---|---|---|
| 6,324,399 B1 | 11/2001 | Salmivalli | |
| 2005/0070283 A1* | 3/2005 | Hashimoto et al. | ........ 455/435.1 |
| 2005/0255846 A1 | 11/2005 | Shimbori | |
| 2006/0098690 A1 | 5/2006 | Park | |

FOREIGN PATENT DOCUMENTS

| | | |
|---|---|---|
| CN | 1774131 A | 5/2006 |
| GB | 2 297 457 A | 7/1996 |
| JP | 10-285276 | 10/1998 |
| WO | WO 01/97548 A1 | 12/2001 |

OTHER PUBLICATIONS

Communication dated Jun. 2, 2008; Extended European Search Report in the corresponding European Patent Application No. 07123618.6-2414.
First Notification of Office Action dated Jun. 11, 2010 received in corresponding Chinese Patent Application No. 200810001377.3.

* cited by examiner

Primary Examiner — Marivelisse Santiago Cordero
Assistant Examiner — Omoniyi A Obayanju
(74) Attorney, Agent, or Firm — Murphy & King, P.C.

(57) ABSTRACT

In a mobile-communication system including a base-transceiver station (BTS), a visitor-location register (VLR), and controllers for controlling a mobile station (MS), the controllers including at least one mobile-switching center (MSC) each controlling at least one radio-network controller (RNC), when a location-registration request is transmitted from the MS, it is determined whether or not being located in a controlled area of the controllers is allowed. If being located in a controlled area of one of the controllers is not allowed, re-location registration is performed for a cell placed under control of the other controller. If it is difficult to perform the re-location registration, forced-location registration is performed so that the location of a different MS is registered with a different cell. Subsequently, it becomes possible to decrease the state where originating calls are made with difficulty when subscribers are concentrated in a predetermined area.

6 Claims, 25 Drawing Sheets

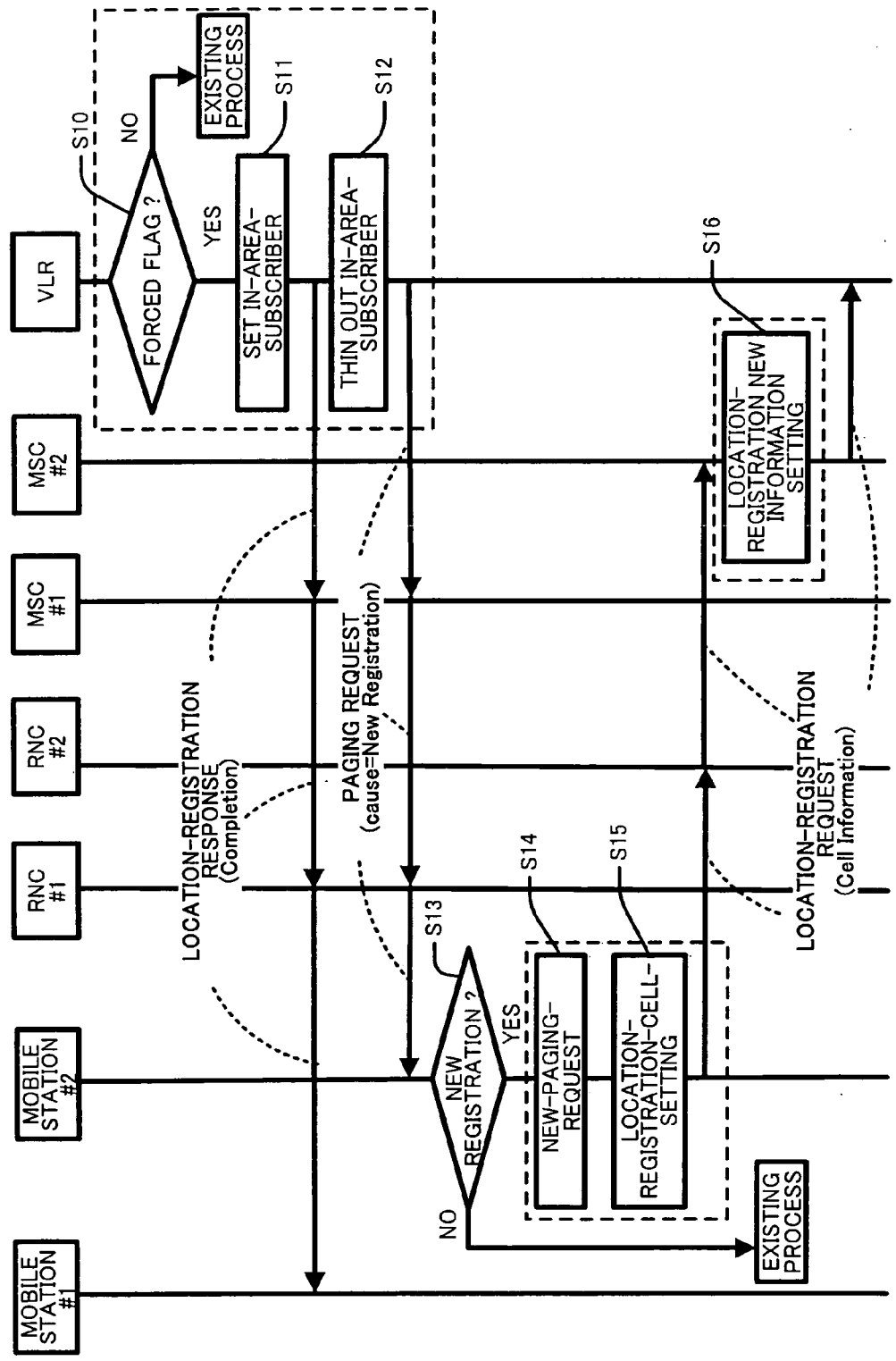

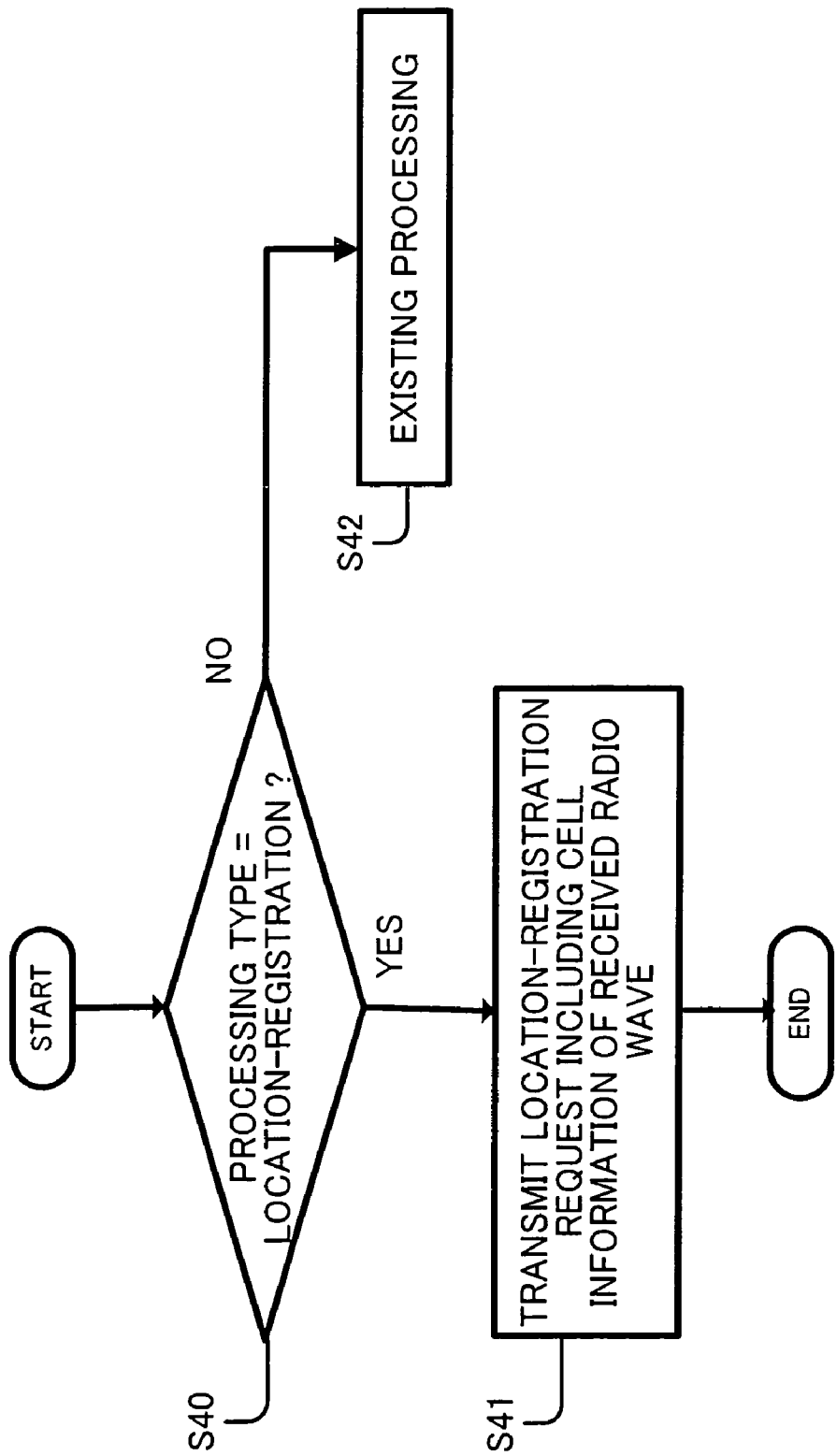

FIG. 10A

| Information Element | Type/Reference | Presence | Remarks |
|---|---|---|---|
| Protocol discriminator | Protocol discriminator | M | Existing |
| Skip indicator | Skip indicator | M | Existing |
| Routing area update request message identity | Message type | M | Existing |
| Update type | Update type | M | Existing |
| GPRS ciphering key sequence number | Ciphering key sequence number | M | Existing |
| Old routing area identification | Routing area identification | M | Existing |
| MS Radio Access capability | MS Radio Access capability | M | Existing |
| Old P-TMSI signature | P-TMSI signature | O | Existing |
| Requested READY timer value | GPRS Timer | O | Existing |
| DRX parameter | DRX parameter | O | Existing |
| TMSI status | TMSI status | O | Existing |
| P-TMSI | Mobile identity | O | Existing |
| MS network capability | MS network capability | O | Existing |
| PDP context status | PDP context status | O | Existing |
| Cell Information | Received Cell Number | O | New |
| Forced Flag | Flag | O | New |

FIG. 10B

| 8 | 7 | 6 | 5 | 4 | 3 | 2 | 1 | | Remarks |
|---|---|---|---|---|---|---|---|---|---|
| 0 | 0 | 0 | 0 | 0 | 0 | 1 | 0 | IMSI unknown in HLR | Existing |
| 0 | 0 | 0 | 0 | 0 | 0 | 1 | 1 | Illegal MS | Existing |
| 0 | 0 | 0 | 0 | 0 | 1 | 1 | 0 | Illegal ME | Existing |
| 0 | 0 | 0 | 0 | 0 | 1 | 1 | 1 | GPRS services not allowed | Existing |
| 0 | 0 | 0 | 0 | 1 | 0 | 0 | 0 | GPRS services and non-GPRS services not allowed | Existing |
| 0 | 0 | 0 | 0 | 1 | 0 | 0 | 1 | MS identity cannot be derived by the network | Existing |
| 0 | 0 | 0 | 0 | 1 | 0 | 1 | 0 | Implicitly detached | Existing |
| 0 | 0 | 0 | 0 | 1 | 0 | 1 | 1 | PLMN not allowed | Existing |
| 0 | 0 | 0 | 0 | 1 | 1 | 0 | 0 | Location Area not allowed | Existing |
| 0 | 0 | 0 | 0 | 1 | 1 | 0 | 1 | Roaming not allowed in this location area | Existing |
| 0 | 0 | 0 | 0 | 1 | 1 | 1 | 0 | GPRS services not allowed in this PLMN | Existing |
| 0 | 0 | 0 | 0 | 1 | 1 | 1 | 1 | No Suitable Cells In Location Area | Existing |
| 0 | 0 | 0 | 1 | 0 | 0 | 0 | 0 | MSC temporarily not reachable | Existing |
| 0 | 0 | 0 | 1 | 0 | 0 | 0 | 1 | Network failure | Existing |
| 0 | 0 | 0 | 1 | 0 | 1 | 0 | 0 | MAC failure | Existing |
| 0 | 0 | 0 | 1 | 0 | 1 | 0 | 1 | Synch failure | Existing |
| 0 | 0 | 0 | 1 | 0 | 1 | 1 | 0 | Congestion | Existing |
| 0 | 0 | 0 | 1 | 0 | 1 | 1 | 1 | GSM authentication unacceptable | Existing |
| 0 | 0 | 1 | 0 | 1 | 0 | 0 | 0 | No PDP context activated | Existing |
| 0 | 0 | 1 | 1 | 0 | 0 | 0 | 0 | ⎫ retry upon entry into a new cell | Existing |
| | | | to | | | | | ⎬ | |
| 0 | 0 | 1 | 1 | 1 | 1 | 1 | 1 | ⎭ | Existing |
| 0 | 1 | 0 | 1 | 1 | 1 | 1 | 1 | Semantically incorrect message | Existing |
| 0 | 1 | 1 | 0 | 0 | 0 | 0 | 0 | Invalid mandatory information | Existing |
| 0 | 1 | 1 | 0 | 0 | 0 | 0 | 1 | Message type non-existent or not implemented | Existing |
| 0 | 1 | 1 | 0 | 0 | 0 | 1 | 0 | Message type not compatible with the protocol state | Existing |
| 0 | 1 | 1 | 0 | 0 | 0 | 1 | 1 | Information element non-existent or not implemented | Existing |
| 0 | 1 | 1 | 0 | 0 | 1 | 0 | 0 | Conditional IE error | Existing |
| 0 | 1 | 1 | 0 | 0 | 1 | 0 | 1 | Message not compatible with the protocol state | Existing |
| 0 | 1 | 1 | 0 | 1 | 1 | 1 | 1 | Protocol error, unspecified | Existing |
| x | x | x | x | x | x | x | x | Temporary Rejection | New |

FIG. 12A

| Parameter Name | Request | Indication | Response | Confirm |
|---|---|---|---|---|
| Invoked Id | M | M(=) | M(=) | M(=) |
| IMSI | M | M(=) | | |
| MSC Address | M | M(=) | | |
| VLR number | M | M(=) | | |
| LMSI | U | C(=) | | |
| Supported CAMEL Phases | C | C(=) | | |
| SoLSA Support Indicator | C | C(=) | | |
| IST Support Indicator | C | C(=) | | |
| Super-Chager Supported in Serving Network Entity | C | C(=) | | |
| Long FTN Supported | C | C(=) | | |
| Supported LCS Capability | C | C(=) | | |
| Inform Previous Network Entity | C | C(=) | | |
| Cell Information | C | C(=) | | |
| Forced Flag | C | C(=) | | |
| HLR number | | | C | C(=) |
| User error (temporary rejection: newly added) | | | C | C(=) |
| Provider error | | | | O |

FIG. 12B

| Parameter name | Request | Indication | Response | Confirm |
|---|---|---|---|---|
| Invoked Id | M | M(=) | M(=) | M(=) |
| IMSI | M | M(=) | | |
| Stored location area ID | M | M(=) | | |
| TMSI | U | C(=) | | |
| New registration | U | C(=) | | |
| User error | | | C | C(=) |
| Provider error | | | | O |

FIG. 12C

| IE/GROUP Name | Presence | Range | IE type and reference | Semantics description |
|---|---|---|---|---|
| Paging Cause | M | | ENUMERATED (Terminating Conversational Call, Terminating Streaming Call, Terminating Interactive Call, Terminating Background Call, Terminating Low Priority Signaling, ..., Terminating High Priority Signaling, New Registration) | |

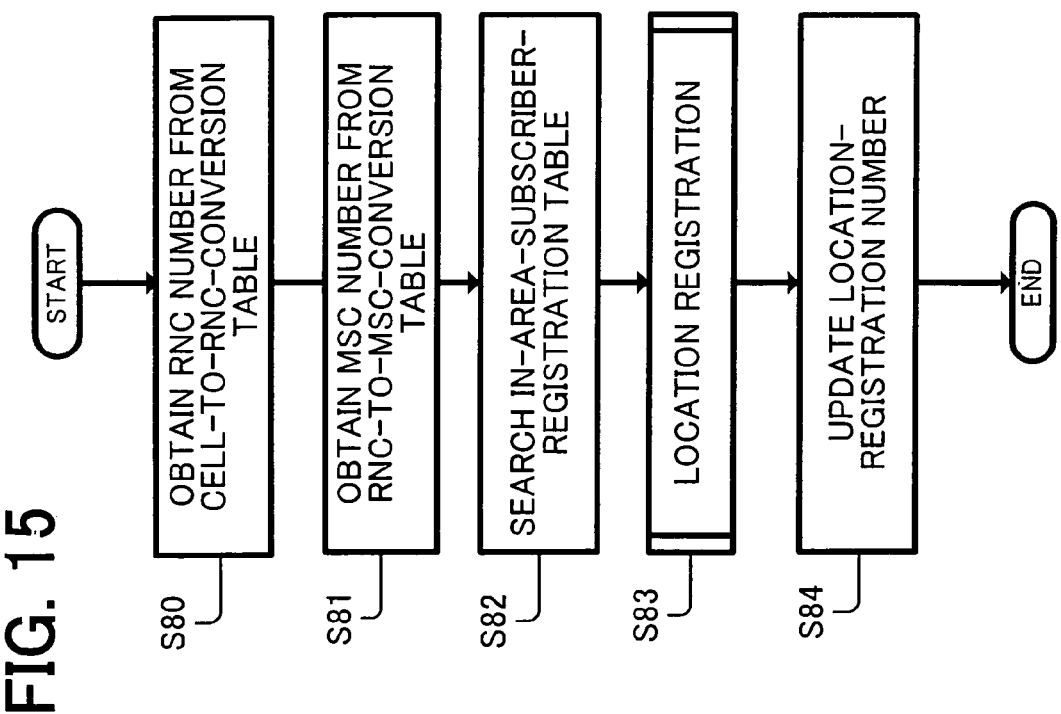

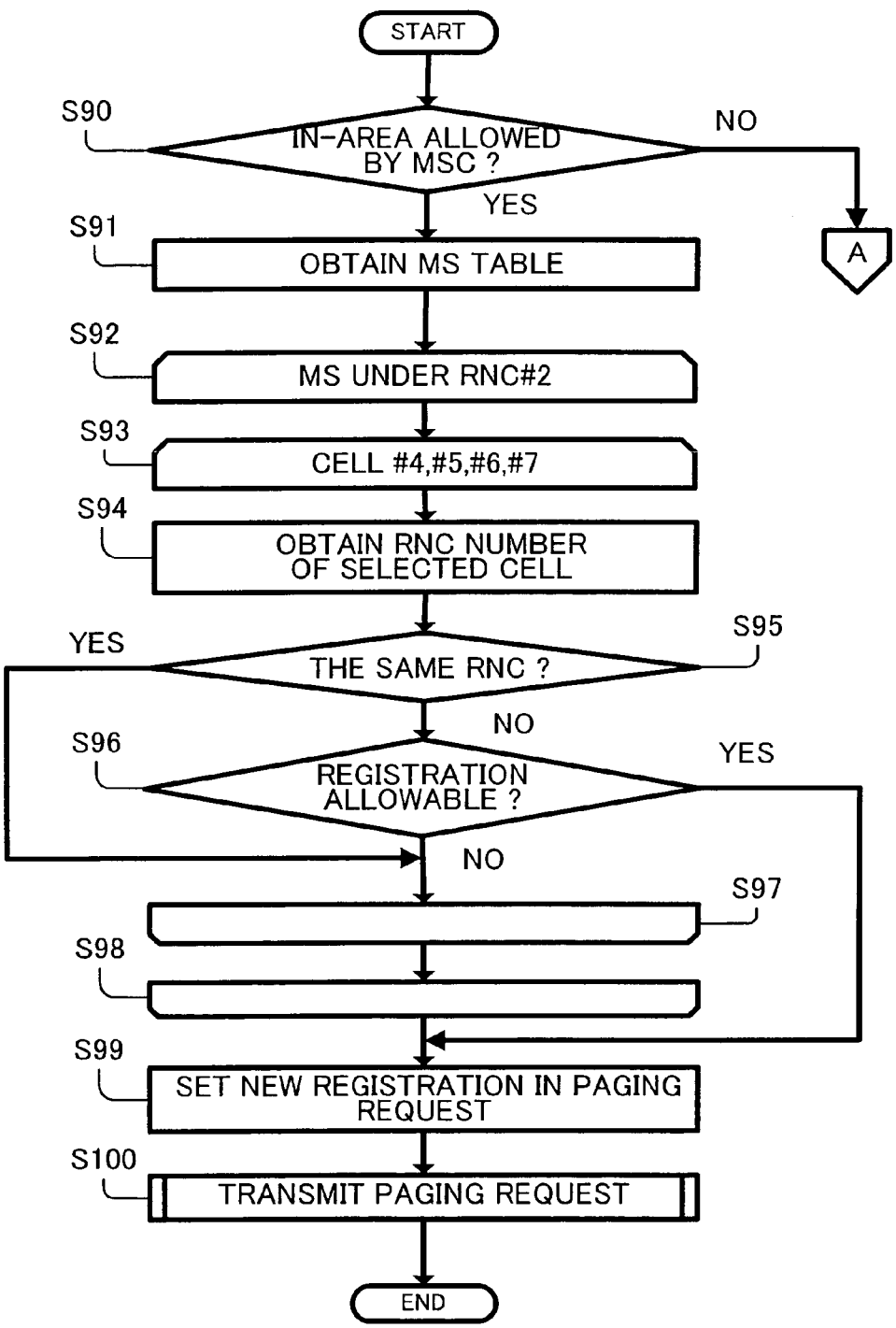

METHOD OF REGISTERING LOCATION OF MOBILE-COMMUNICATION SYSTEM AND DEVICE THEREFOR

CROSS-REFERENCE TO RELATED APPLICATIONS

This application is based upon and claims the benefit of priority from the prior Japanese Patent Application No. 2007-007921, filed Jan. 17, 2007, the entire contents of which are incorporated herein by reference.

BACKGROUND OF THE INVENTION

1. Field of the Invention

The present invention relates to a method of registering the location of a mobile-communication system and a device therefore, and particularly relates to a method of registering the location of a mobile station in a mobile-communication system and a device therefor.

2. Description of the Related Art

FIG. 1 shows example operation sequences of a location-registration method used for a known mobile-communication system. In FIG. 1, a location-registration request transmitted from a mobile station 1 arrives at a visitor-location register (VLR) 4 via a radio-network controller (RNC) 2 and a mobile-switching center (MSC) 3. Hereinafter, the term "visitor" indicates an in-area subscriber.

The VLR 4 determines whether or not the above-described location registration can be performed. If the location registration is allowed, the VLR 4 performs the location registration and notifies the mobile station 1 that the location registration is finished. If the location registration is not permitted, the VLR 4 notifies the mobile station 1 that it is difficult to register the location.

In the known mobile-communication system, the number of in-area subscribers registering the locations of mobile stations depends on the capacity of the VLR functioning as a visited-network-location-registration database, and regulation synchronized with call processing is not performed when the location registration is performed.

Further, according to Japanese Unexamined Patent Application Publication No. 10-285276, regulation processing is performed for each of relating exchanges based on the result of a comparison of the total of accesses to a home memory storing information about the location and communication status of a mover and traffic information relating to the call-processing capability of the home memory.

When the location registration performed for originating calls and/or incoming calls made by in-area subscribers concentrates during a predetermined time period, the capacity of an exchange including the MSC, the RNC, etc. is exceeded, so that it may become difficult to make another originating call and/or the exchange failure may occur.

Further, the in-area location of a subscriber basically depends on the intensity of a transmitted radio wave and the movement of a person, so that subscribers often concentrate in a predetermined area. In that case, the capacity of a base-transceiver station (BTS) and/or the RNC is exceeded, so that it becomes difficult to make an originating call.

Further, cell information managed by an exchange including the known MSC, RNC, etc. is not managed by the VLR which is a higher-order step due to an insufficient memory capacity.

SUMMARY

Accordingly, the present invention provides a method for registering a location of a mobile station (MS) in a mobile-communication system which includes a base-transceiver station (BTS), a visitor-location register (VLR), and controllers for controlling the mobile station (MS), the controllers including at least one mobile-switching center (MSC) each controlling at least one radio-network controller (RNC).

According to one aspect of the present invention, there is provided a method comprising providing the visitor-location register (VLR) with an in-area-subscriber-registration table including a location-registration number of the controllers, a location-registration-allowable number of the controllers, and cell information of the mobile station (MS), the location-registration number being the number of mobile stations which the controllers are currently controlling, the location-registration-allowable number being the number of mobile stations allowable for the controllers to control, the cell information of the mobile station (MS) including a cell number of a cell in which the mobile station (MS) is located, transmitting, by the mobile station (MS), to the visitor-location register (VLR), a location-registration request including cell information received from a radio wave transmitted from the base-transceiver station (BTS), determining, by the visitor-location register (VLR), whether or not the mobile station (MS) is allowed to be located in a controlled area of the controllers, on the basis of the location-registration number of the controller, the location-registration-allowable number of the controller, and the cell information of the mobile station (MS), updating, by the visitor-location register (VLR), the location-registration number of the controllers and the cell information of the mobile station (MS) when the mobile station (MS) is allowed to be located in a controlled area of the controllers, transmitting, by the visitor-location register (VLR), to the mobile station (MS), a location registration response indicating temporary rejection of a cell indicated by the cell information included in the location-registration request, when the mobile station (MS) is not allowed to be located in a controlled area of the controllers, and transmitting, by the mobile station (MS), to the visitor-location register (VLR), a location-registration request including cell information of a next-selection cell which is a cell that is not temporarily rejected by the visitor-location register (VLR) and has a reception radio wave with high intensity second to the temporarily rejected cell.

According to another aspect of the present invention, there is provided a method comprising further comprising transmitting, by the mobile station (MS), to the visitor-location register (VLR), a location-registration request including a forced flag and cell information of a cell corresponding an arbitrary base-transceiver station (BTS) from which the mobile station (MS) is able to receive a radio wave, when the next-selection cell does not exist, the forced flag indicating to the visitor-location register (VLR) that location registration of the mobile station (MS) should be done by force, updating, by the visitor-location register (VLR), the location-registration number of the controllers and cell information of the mobile station (MS) upon receiving the location-registration request including the forced flag with ON value, transmitting, by the visitor-location register (VLR), a paging request indicating new registration to the mobile station (MS), selecting, by the mobile station (MS), an arbitrary cell other than a cell for which location registration is currently done, from among cells for which location registration can be done, upon receiving the paging request indicating new registration from the visitor-location register (VLR), and transmitting, by the mobile station, a location-registration request including cell information of the selected arbitrary cell to the visitor-location register (VLR).

According to the present invention, it becomes possible to decrease the state where originating calls are made with difficulty when subscribers are concentrated in a predetermined area.

BRIEF DESCRIPTION OF THE DRAWINGS

FIGS. 8A to 8D show operation sequences of a location-registration method according to the embodiment of the present invention;

FIG. 9 is a flowchart of location-registration-cell-setting processing of a mobile station (MS) according to the embodiment of the present invention;

FIG. 10A shows parameter information according to the embodiment of the present invention;

FIG. 10B shows cause information according to the embodiment of the present invention;

FIG. 12A shows parameter information according to the embodiment of the present invention;

FIG. 12B shows other parameter information according to the embodiment of the present invention;

FIG. 12C shows cause information according to the embodiment of the present invention;

FIG. 15 is a flowchart of in-area-subscriber-setting processing of a visitor-location register (VLR) according to the embodiment of the present invention;

FIGS. 16A to 16B are flowcharts of in-area-subscriber-thinning-out processing of a visitor-location register (VLR) according to the embodiment of the present invention.

DESCRIPTION OF THE PREFERRED EMBODIMENTS

Hereinafter, embodiments of the present invention will be described with reference to the attached drawings.

<Configuration of Mobile-Communication System>

Figure 1:
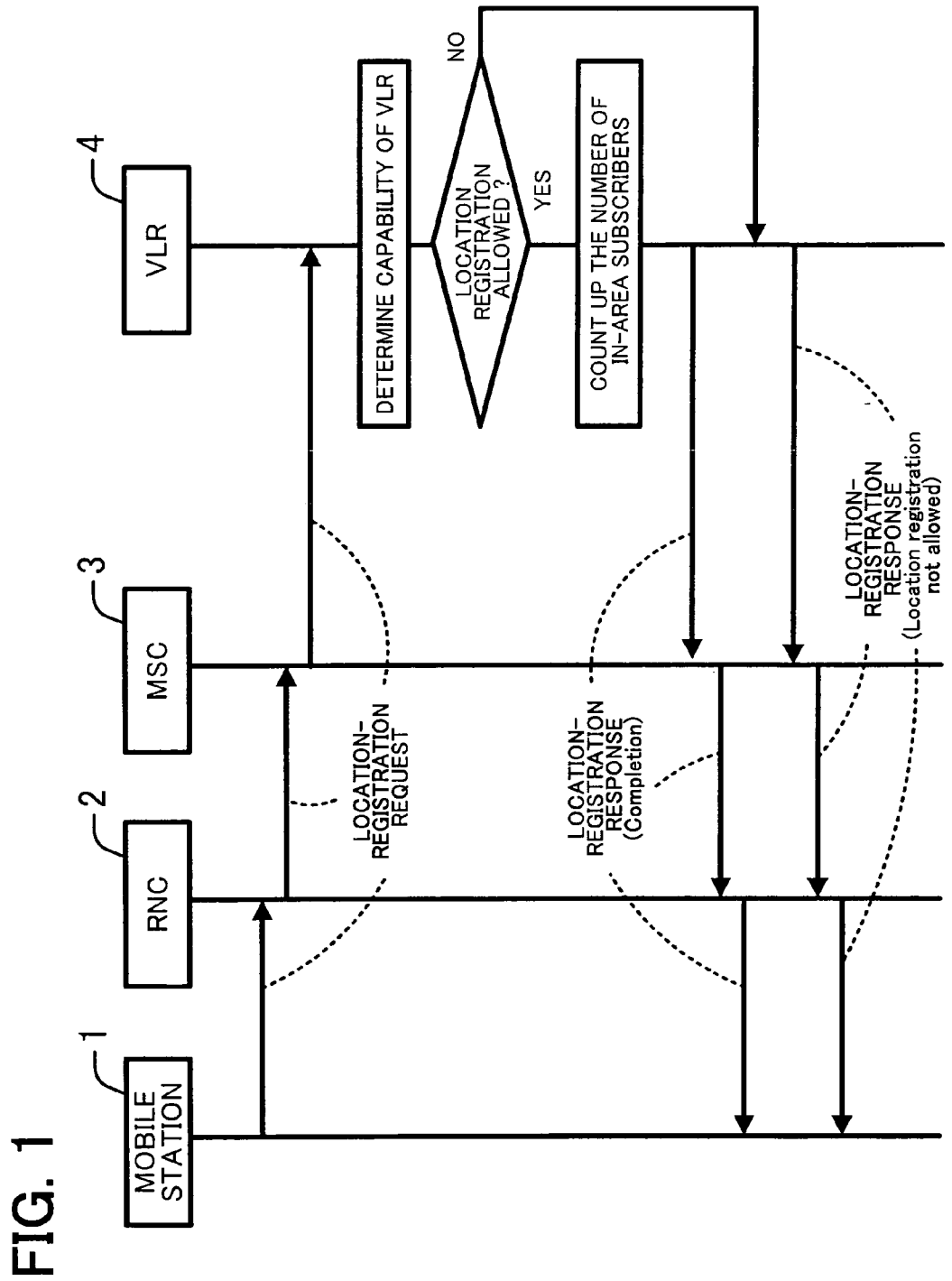
FIG. 1 shows example operation sequences of a known location-registration method.
Figure 2:
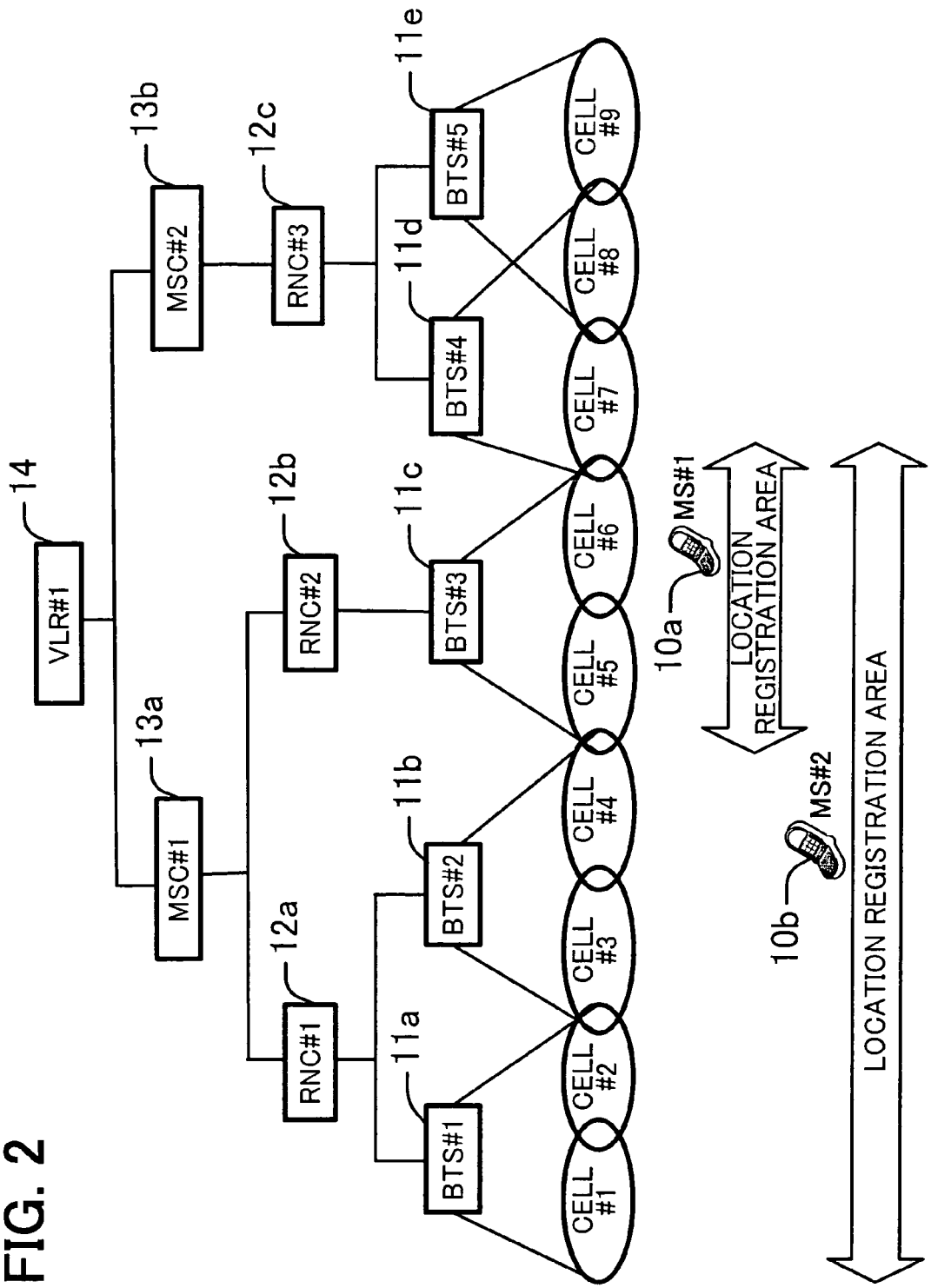
FIG. 2 shows the configuration of a mobile-communication system according to an embodiment of the present invention.

FIG. 2 shows the configuration of a mobile-communication system according to an embodiment of the present invention. FIG. 2 schematically shows the mobile-communication system including mobile stations (MS) $10a$ and $10b$, and base-transceiver stations (BTS) $11a$, $11b$, $11c$, $11d$, and $11e$, and radio-network controllers (RNC) $12a$, $12b$, and $12c$ that generate a wireless-access network. The mobile-communication system further includes mobile-switching centers (MSC) $13a$ and $13b$, and a visitor-location register (VLR) $14$ that generate a core network.

The BTSs $11a$ to $11e$ of the wireless-access network are wirelessly connected to the MSs $10a$ and $10b$. The BTSs $11a$ to $11e$ are connected to the MSCs $13a$ and $13b$ of the core network via the RNCs $12a$ to $12c$.

The MSCs $13a$ and $13b$ perform originating-call processing, incoming-call processing, location-registration processing, routing-control processing, etc. The VLR $14$ stores information about the location-registration-allowable number and location-registration number of each of the MSCs $13a$ and $13b$, and the RNCs $12a$ to $12c$, and cell information of each of the MSs $10a$ and $10b$ in an in-area-subscriber-registration table so that in-area subscribers are controlled.

<Functional Configurations of MS, MSC, and VLR>

Figure 3:
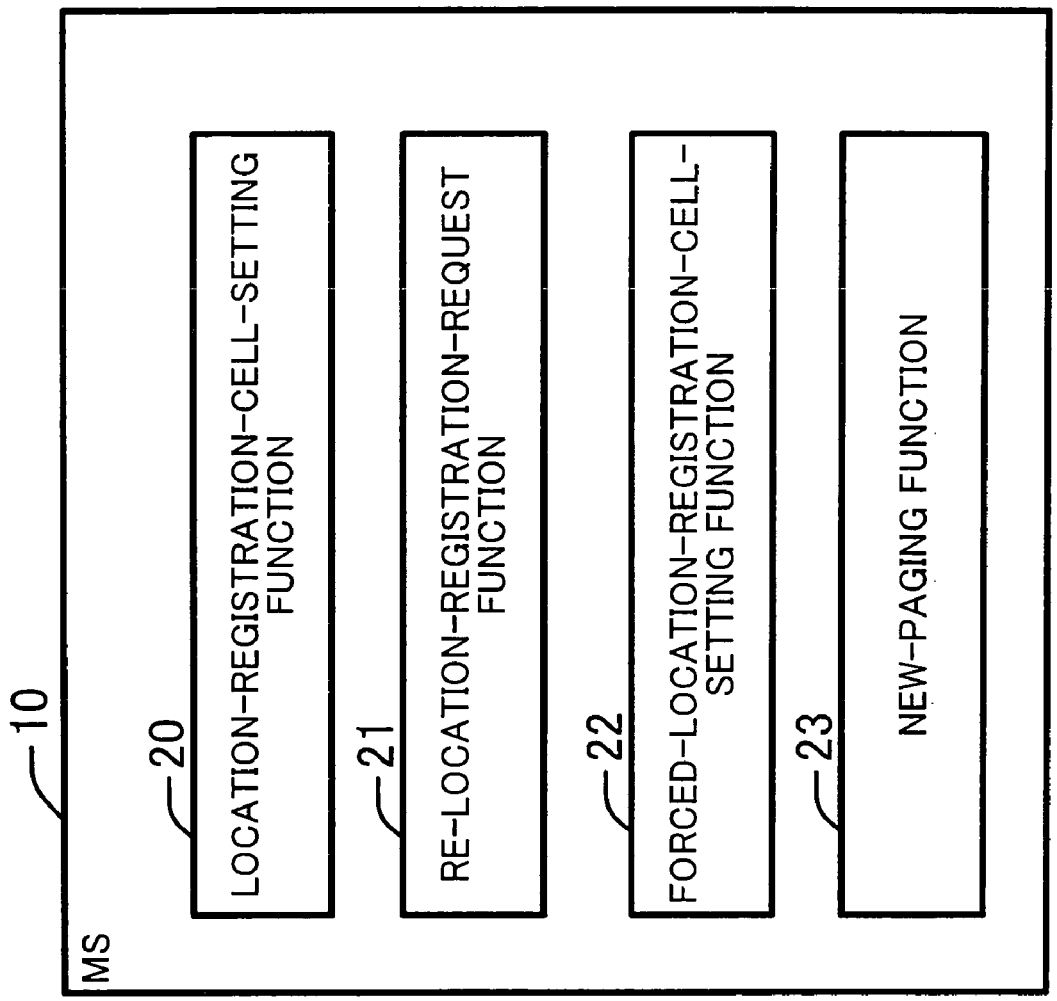
FIG. 3 shows the functional configuration of a mobile station (MS) according to the embodiment of the present invention.

FIG. 3 shows the functional configuration of a mobile station (MS) according to an embodiment of the present invention. In FIG. 3, the MS $10$ includes a location-registration-cell-setting function $20$ provided to perform location-registration-cell-setting processing, a re-location-registration-request function $21$ provided to perform re-location-registration-request processing, a forced-location-registration-cell-setting function $22$ provided to perform location-registration-new-information-setting processing, and a new-paging function $23$, as new functions.

Figure 4:
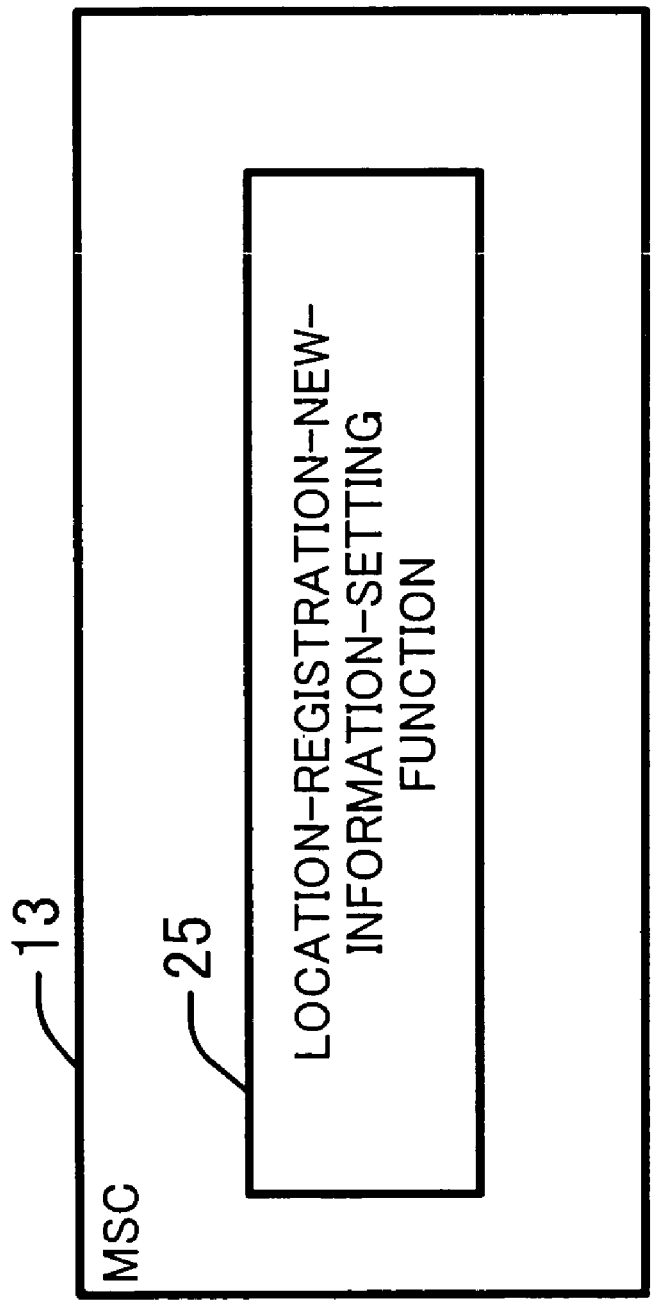
FIG. 4 shows the functional configuration of a mobile-switching center (MSC) according to the embodiment of the present invention.

FIG. 4 shows the functional configuration of an mobile-switching center (MSC) according to an embodiment of the present invention. In FIG. 4, the MSC $13$ includes a location-registration-new-information-setting function $25$ provided to perform location-registration-new-information-setting processing, as a new function.

Figure 5:
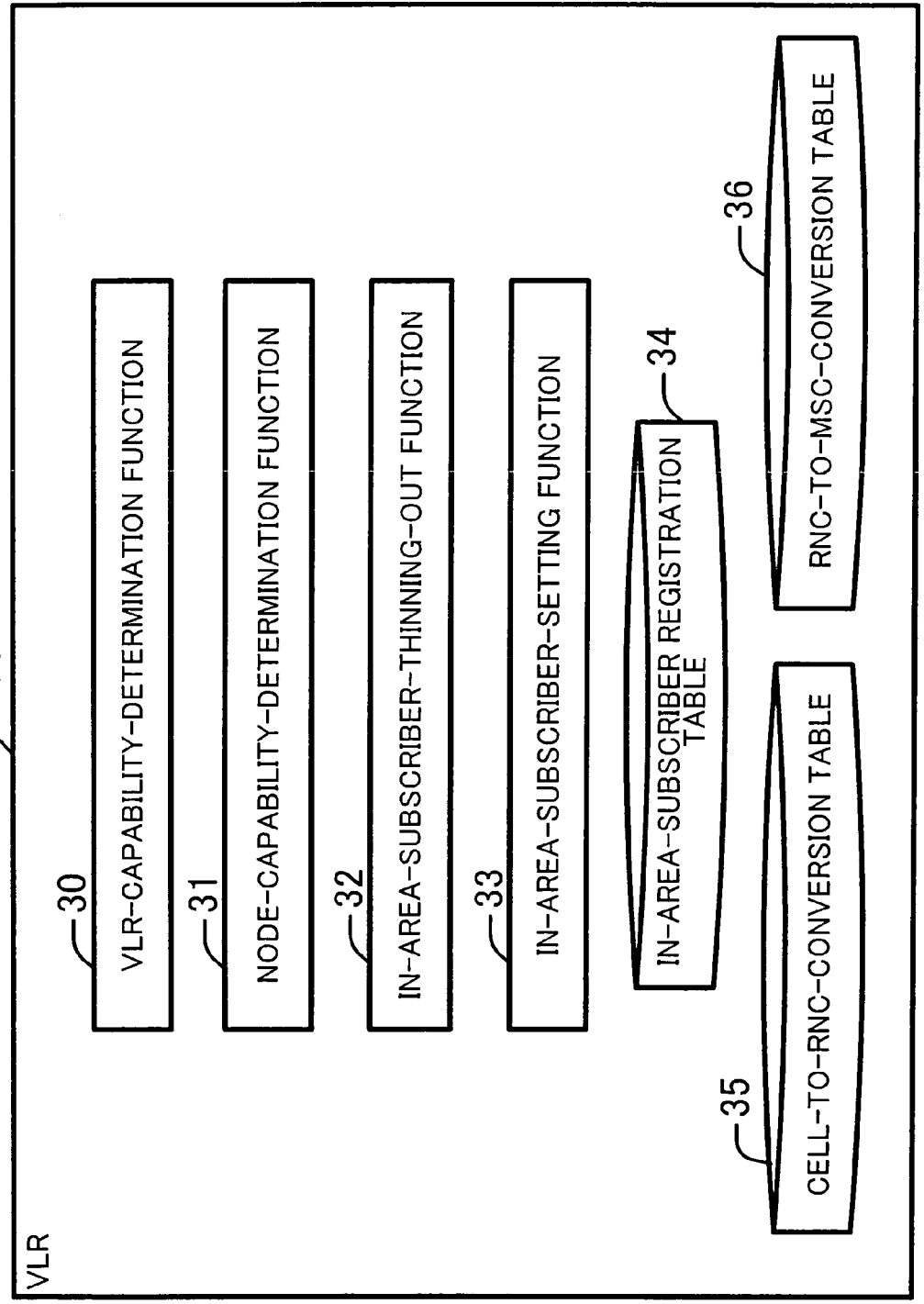
FIG. 5 shows the functional configuration of a visitor-location register (VLR) according to the embodiment of the present invention.

FIG. 5 shows the functional configuration of a visitor-location register (VLR) according to an embodiment of the present invention. In FIG. 5, the VLR $14$ includes a VLR-capability-determination function $30$ provided to perform VLR-capability-determination processing, a node-capability-determination function $31$ provided to perform node-capability-determination processing, an in-area-subscriber-thinning-out function $32$ provided to perform in-area-subscriber-thinning-out processing, an in-area-subscriber-setting function $33$ provided to perform in-area-subscriber-setting processing, an in-area-subscriber-registration table $34$, and a cell-to-RNC-conversion table $35$, and an RNC-to-MSC-conversion table $36$, as new functions.

<Configuration of In-Area-Subscriber-Registration Table>

Figure 6:
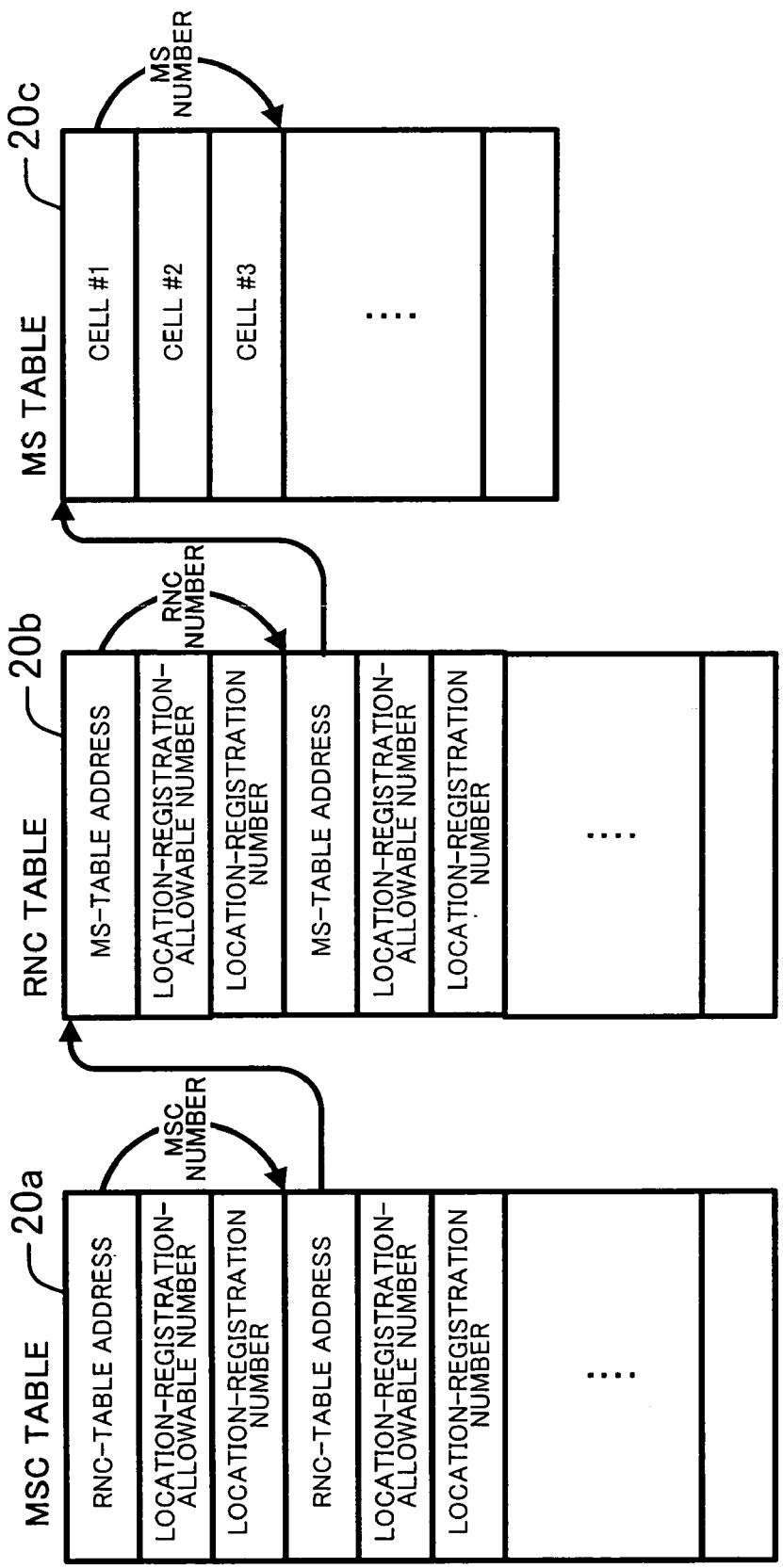
FIG. 6 shows an in-area-subscriber-registration table of a visitor-location register (VLR) according to the embodiment of the present invention.

FIG. 6 shows the configuration of the in-area-subscriber-registration table $34$ according to an embodiment of the present invention, where the in-area-subscriber-registration table $34$ is included in the VLR $14$. In FIG. 6, the in-area-subscriber-registration table $34$ has a hierarchical structure including a MSC table $20a$, an RNC table $20b$, and an MS table $20c$.

The MSC table $20a$ is searched based on the exchange numbers (MSC numbers), and the RNC-table address of each of the RNCs, the location-registration-allowable number of each of the RNCs (the fixed value of each of the RNCs), and the location-registration number (a variable value) of each of the RNCs are registered.

The RNC table 20b is searched based on the RNC numbers, and the MS-table address of each of the BTSs, the location-registration-allowable number of each of the BTSs (the fixed value of each of the BTSs), and the location-registration number (a variable value) of each of the BTSs are registered.

The MS table 20c is searched based on the MS number, and the number of a cell where the MS corresponding to the MS number is located is registered.

<Configurations of Cell-to-RNC-Conversion Table and RNC-to-MSC-Conversion Table>

Figure 7A:
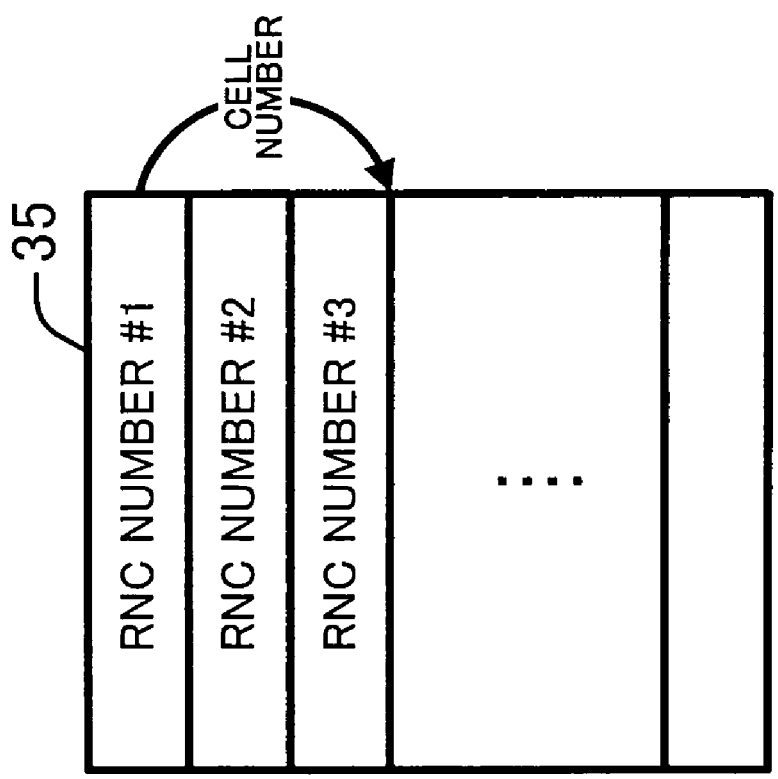
FIG. 7A shows a cell-to-RNC-conversion table according to the embodiment of the present invention.

FIG. 7A shows the configuration of the cell-to-RNC-conversion table 35 according to an embodiment of the present invention, where the cell-to-RNC-conversion table 35 is included-in the VLR 14. In FIG. 7A, the cell-to-RNC-conversion table 35 is searched based on the cell numbers, and the number of an RNC taking charge of cells (RNC number) is registered with the cell-to-RNC-conversion table 35.

Figure 7B:
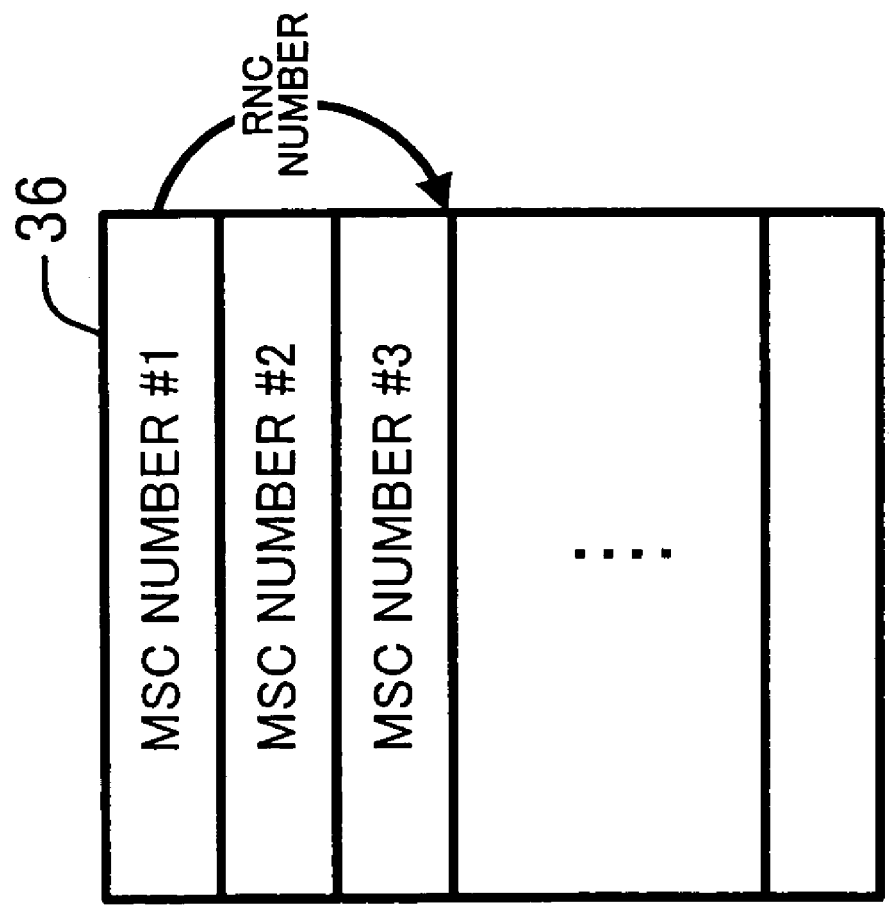
FIG. 7B shows an RNC-to-MSC-conversion table according to the embodiment of the present invention.

FIG. 7B shows the configuration of the RNC-to-MSC-conversion table 36 according to an embodiment of the present invention, where the RNC-to-MSC-conversion table 36 is included in the VLR 14. In FIG. 7B, the RNC-to-MSC-conversion table 36 is searched based on the RNC numbers, and the number of an MSC taking charge of the RNCs (MSC number) is registered with the RNC-to-MSC-conversion table 36.

<Location Registration>

Each of FIGS. 8A to 8D shows operation sequences of a location-registration method according to an embodiment of the present invention. In each of FIGS. 8 and 9, new parts of the embodiment are surrounded by broken lines. At step S1 shown in FIG. 8A, the location-registration-cell-setting function 20 of the MS 10a performs the location-registration-cell-setting processing.

FIG. 9 is a flowchart of location-registration-cell-setting processing of a mobile station (MS) according to the embodiment of the present invention.

In FIG. 9, it is determined whether or not the location registration is performed based on the processing type, at step S40. If it is determined that the location registration is performed, data on the cell number of a received radio wave is set in a location-registration request, as cell information, and transmitted, at step S41. If the processing type does not indicate the location registration, existing processing including originating-call processing, in-coming-call processing, etc. is performed, at step S42.

Subsequently, the cell information is set in the location-registration request transmitted, at step S1 shown in FIG. 8A, and transmitted to the MSC 13a via the BTS 11c and the RNC 12b. Here, parameter information set in a location-registration request of radio-resource-control (RRC) protocol is shown in FIG. 10A, where RRC protocol is equivalent to MM protocol. In the location-registration request, cell information and a forced flag are provided, as parameters, in addition to existing information from a protocol discriminator to a PDP context status, and a received cell number is set, as the cell information.

Figure 8A:
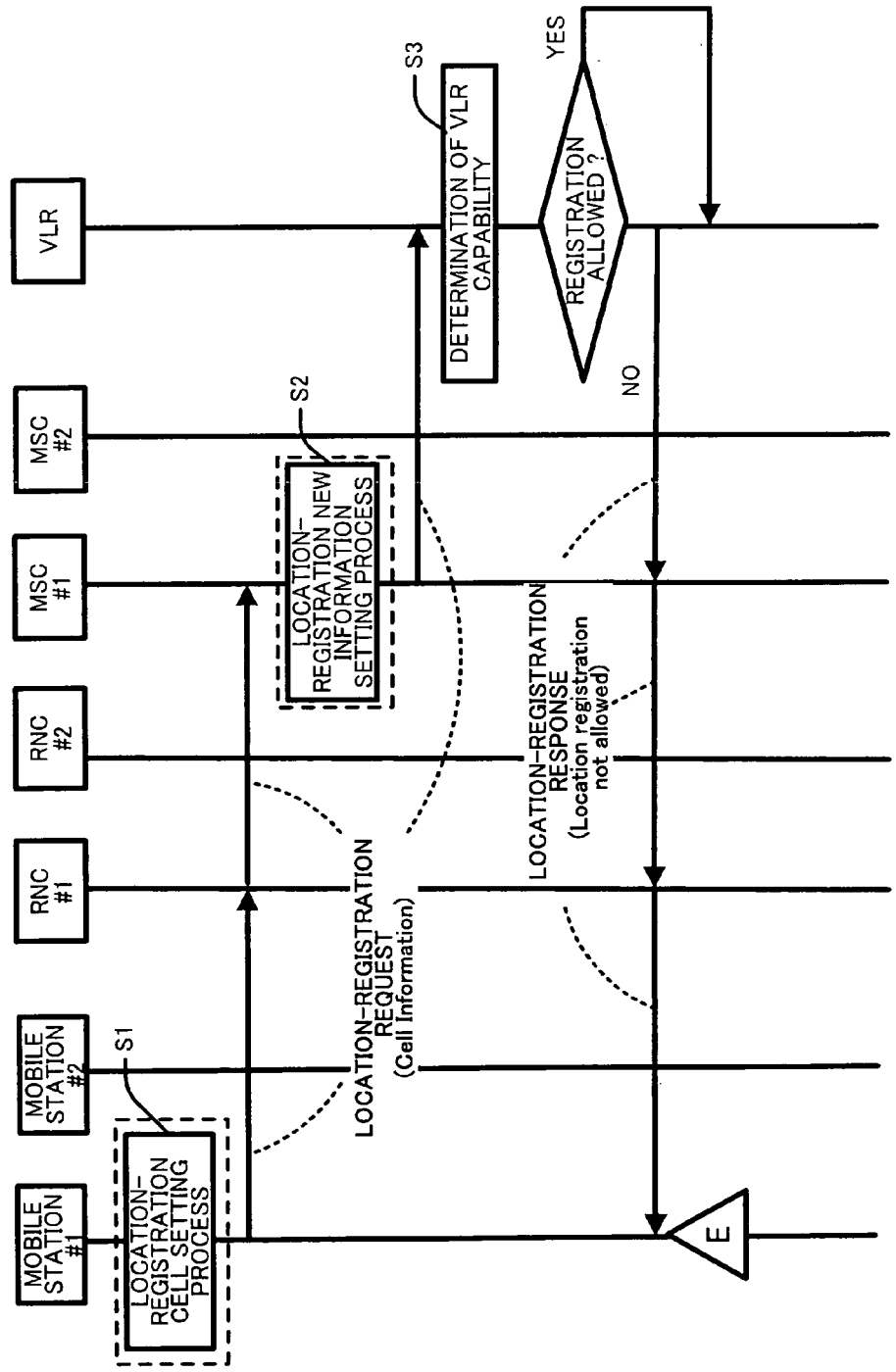

When the location-registration request is transmitted to the MSC 13a, the location-registration-new-information-setting function 25 performs the location-registration-new-information-setting processing, at step S2 shown in FIG. 8A.

Figure 11:
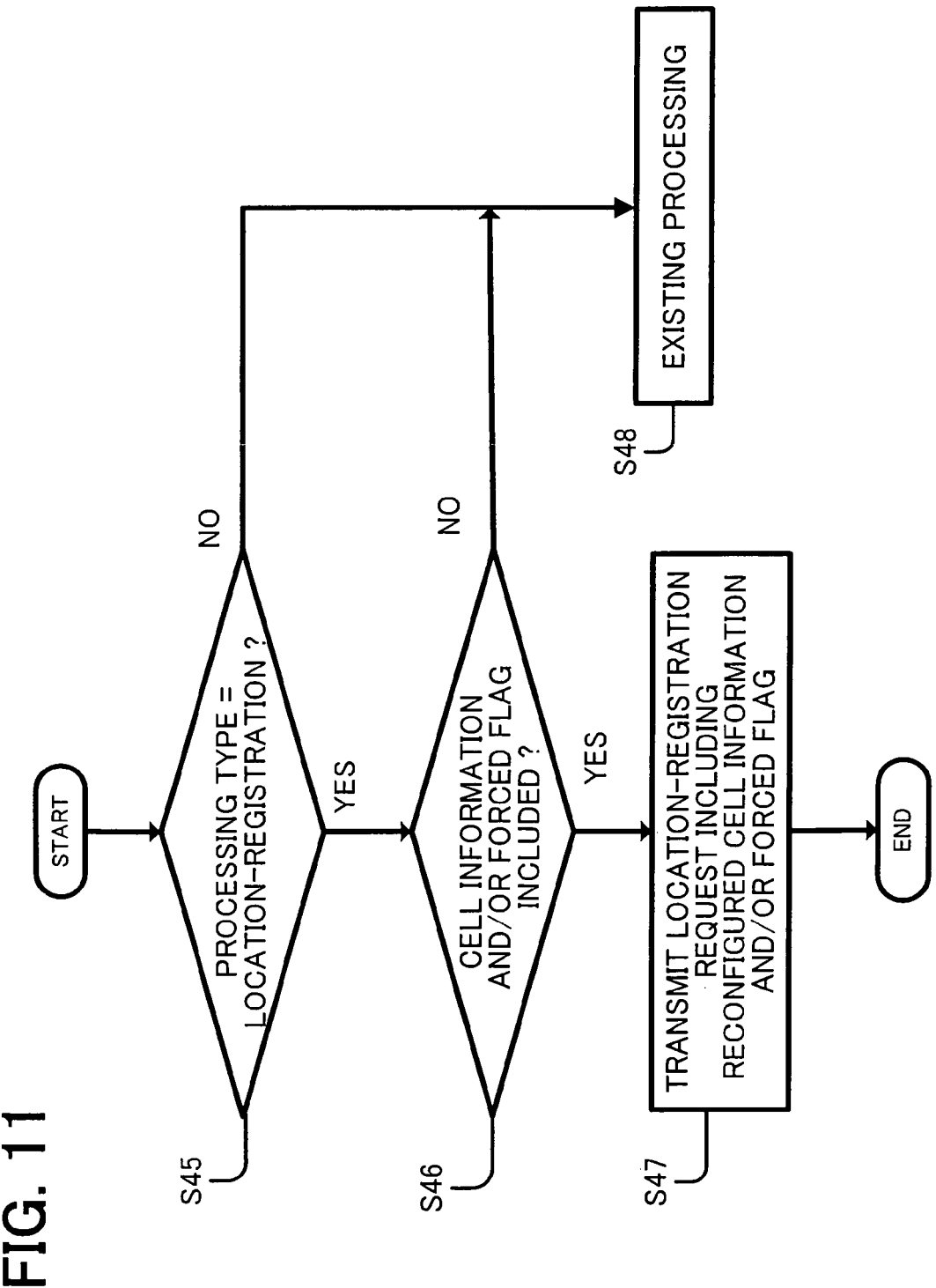
FIG. 11 is a flowchart of location-registration-new-information-setting processing of a mobile-switching center (MSC) according to the embodiment of the present invention.

FIG. 11 is a flowchart of location-registration-new-information-setting processing of a mobile-switching center (MSC) according to the embodiment of the present invention.

In FIG. 11, it is determined whether or not the location-registration request is made based on the processing type of a reception signal, at step S45. If the location-registration request is made, it is determined whether or not the cell information and/or the forced flag is set in the transmitted location-registration request, at step S46. If the cell information and/or the forced flag is set in the location-registration request shown in FIG. 10A, the cell information and/or the forced flag is set in a location-registration request of a MAP protocol shown in FIG. 12A and transmitted to the VLR 14, at step S47. If the processing type does not indicate the location registration, existing processing including the originating-call processing, the in-coming-call processing, etc. is performed, at step S48. Here, the cell information, the forced flag, and data on a user error (temporary rejection) are provided in the location-registration request of the MAP protocol shown in FIG. 12A, as parameters.

Subsequently, the cell information and/or the forced flag is reconfigured in the location-registration request transmitted from an MSC#1 to the VLR 14, and the location-registration request is transmitted to the VLR 14, at step S2 shown in FIG. 8A.

Upon receiving the above-described location-registration request, the VLR-capability-determination function 30 of the VLR 14 performs the VLR-capability-determination processing, so as to determine whether or not the own device has the capability of performing the location registration, at step S3 shown in FIG. 8A. Namely, the VLR-capability-determination function 30 determines whether or not the in-area-subscriber-registration table shown in FIG. 6 has a vacancy. If the own device does not have the capability of performing the location registration, the VLR-capability-determination function 30 responds that it is difficult to perform the location registration. If the own device has the capability of performing the location registration, the VLR-capability-determination function 30 advances to step S4 shown in FIG. 8B.

Figure 8B:
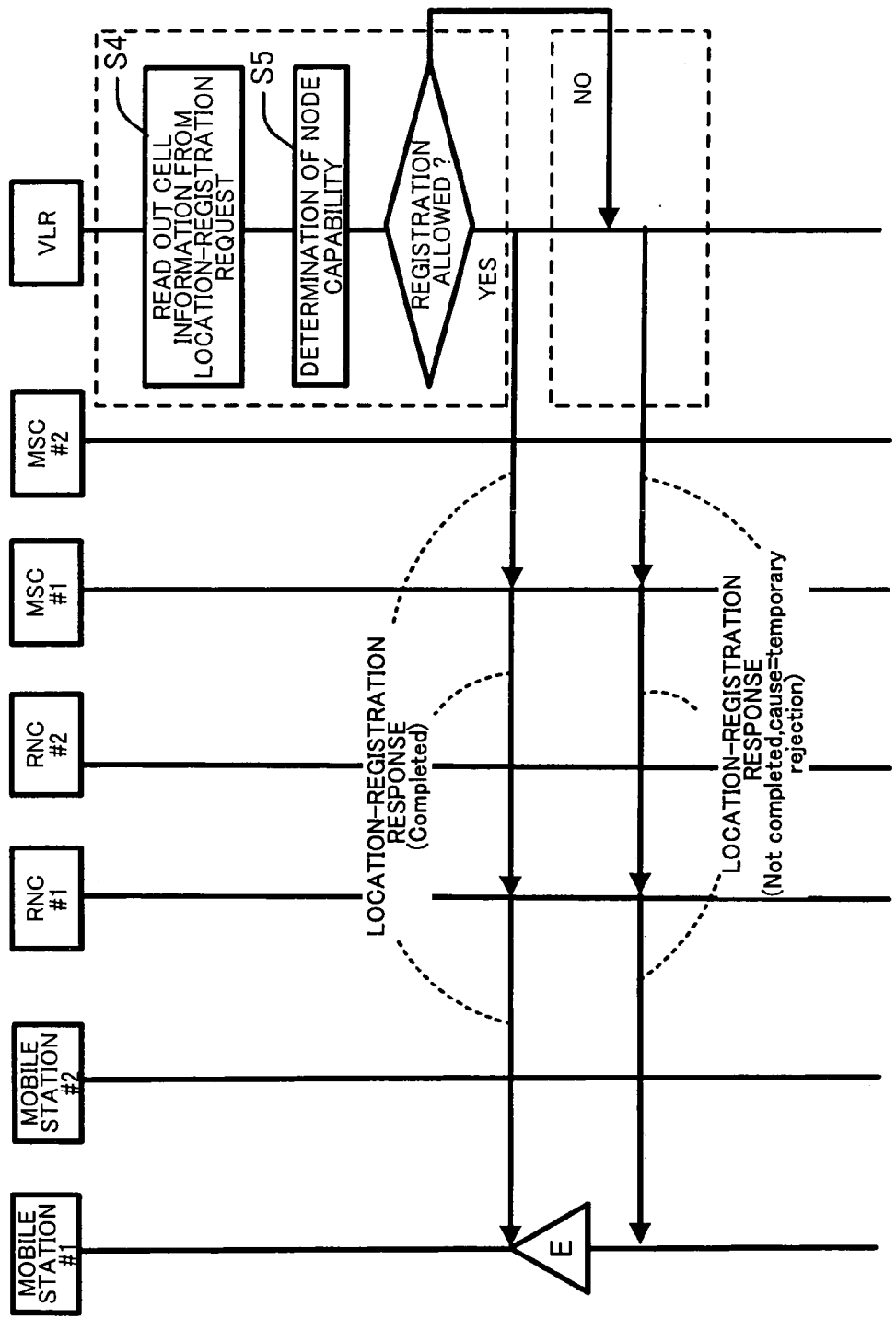

At step S4 shown in FIG. 8B, the VLR 14 retrieves the cell information from the transmitted location-registration request and advances to step S5, and the node-capability-determination function 31 of the VLR 14 performs the node-capability-determination processing.

Figure 13:
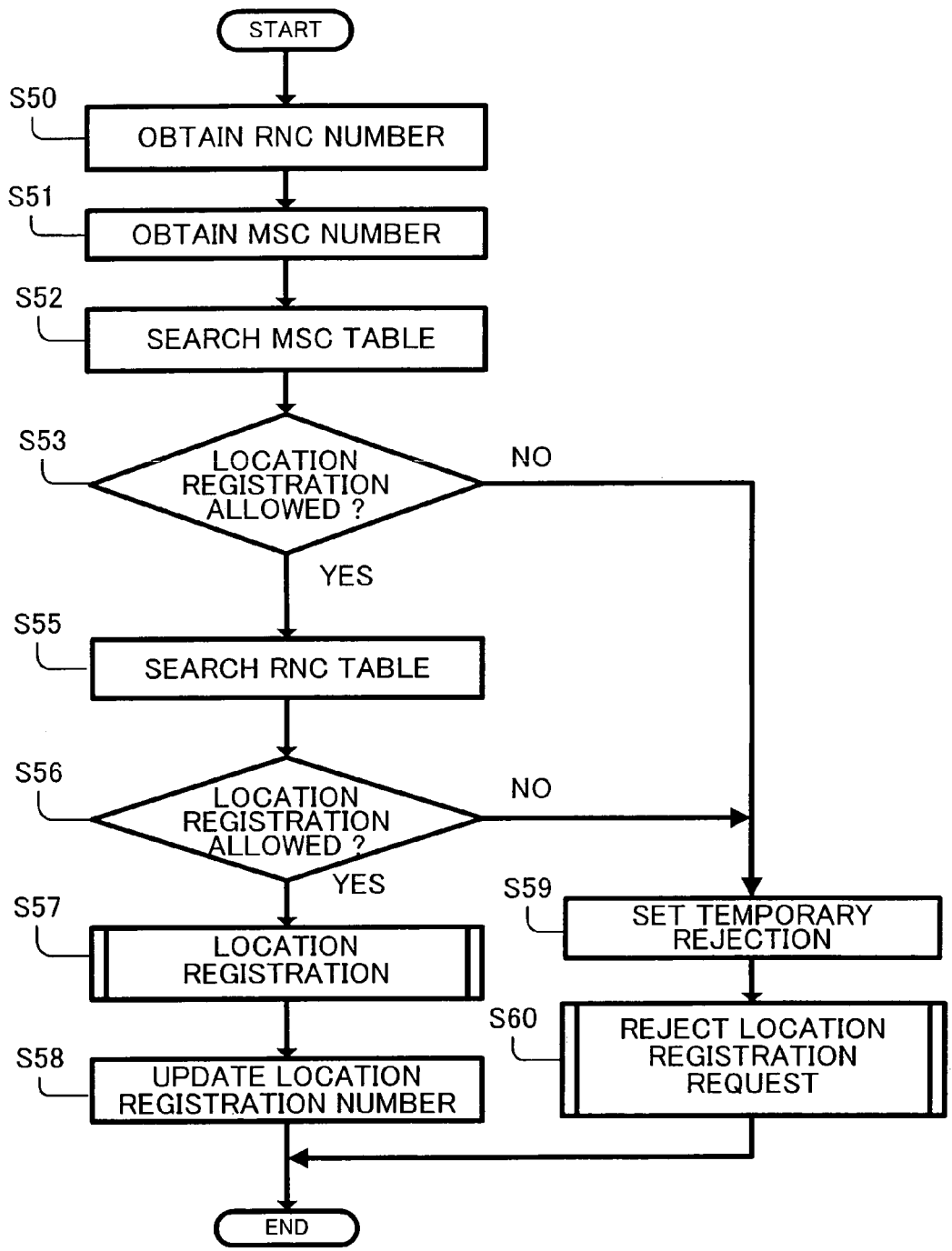
FIG. 13 is a flowchart of node-capability-determination processing of a visitor-location register (VLR) according to the embodiment of the present invention.

FIG. 13 is a flowchart of node-capability-determination processing of a visitor-location register (VLR) according to the embodiment of the present invention.

In FIG. 13, the cell-to-RNC-conversion table 35 is searched based on the cell number of the cell information retrieved from the location-registration request, at step S50, so as to obtain the RNC number corresponding to the cell number. Further, at step S51, the RNC-to-MSC-conversion table 36 is searched based on the RNC number, and the MSC number corresponding to the RNC number is acquired.

Further, the in-area-subscriber-registration table 34 is searched based on the MSC number acquired by searching the above-described RNC-to-MSC-conversion table 36, at step S52 Further, at step S53, it is determined whether or not the location-registration number of the RNC table corresponding to the MSC number is smaller than the location-registration-allowable number thereof. Namely, it is determined whether or not being located in a controlled area is allowed.

If being located in a controlled area is allowed, the in-area-subscriber-registration table 34 is searched based on the RNC number and the MSC number that are acquired by searching the above-described cell-to-RNC-conversion table 35 and RNC-to-MSC-conversion table 36, at step S55. Then, it is determined whether or not the location-registration number of the MS table corresponding to the RNC number is smaller than the location-registration-allowable number, at step S56. Namely, it is determined whether or not being located in a controlled area is allowed.

If being located in a controlled area is allowed, the location registration is performed according to the transmitted location-registration request, and a location-registration response is transmitted to the MS 10a, at step S57. Further, the location-registration number of each of the MSC table 20a and the RNC table 20b that are included in the in-area-subscriber-registration table 34 is updated, and the MS table 20c is updated, at step S58, and the processing is terminated.

On the other hand, if being located in an controlled area is not allowed, at step S53 and/or step S56, "temporary rejection" is set in cause information of the location registration, at step S59, and a location-registration response including "temporary rejection" as cause information thereof, which means rejecting the transmitted location-registration request, is transmitted to the MS 10a, at step S60, and the processing is finished.

Although not shown in FIGS. 8A to 8D, when the above-described location-registration response is transmitted from the VLR 14 to the MS 10a, the location-registration response is subjected to protocol conversion in the MSC 13a provided between the VLR 14 and the MS 10a. Here, the location-registration response transmitted and/or received between the VLR and the MSC is equivalent to the location-registration request shown in FIG. 12A. FIG. 10B shows the cause information set in the location-registration response transmitted and/or received between the MSC and the MS. The above-described "temporary rejection" is newly set according to an embodiment of the present invention.

Figure 8C:
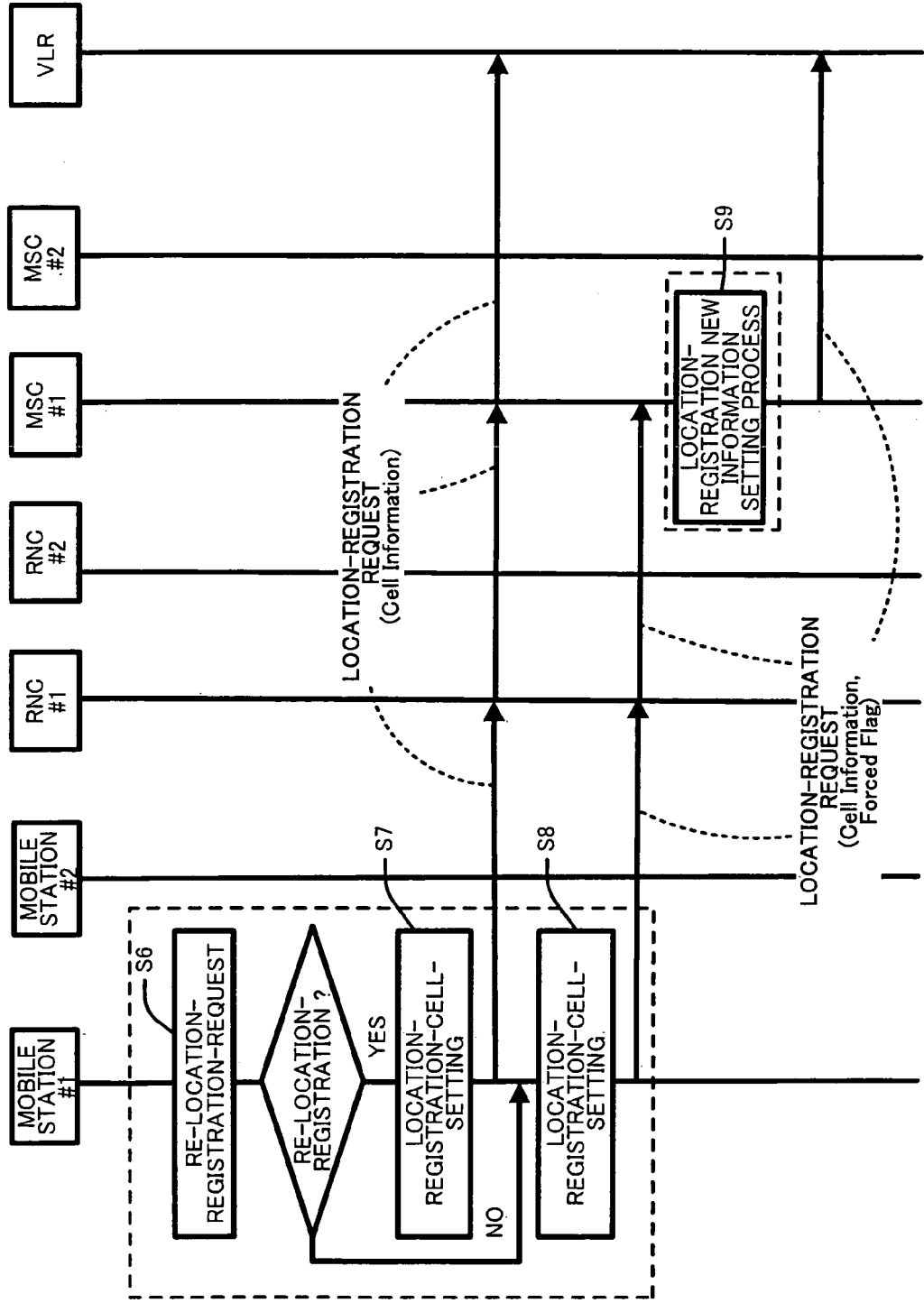

In FIG. 8B, when the location-registration response including the cause information indicating "temporary rejection" is transmitted to the MS 10a, the re-location-registration-request function 21 and the forced-location-registration-cell-setting function 22 perform location-registration-new-information-setting processing, at step S6 shown in FIG. 8C.

Figure 14:
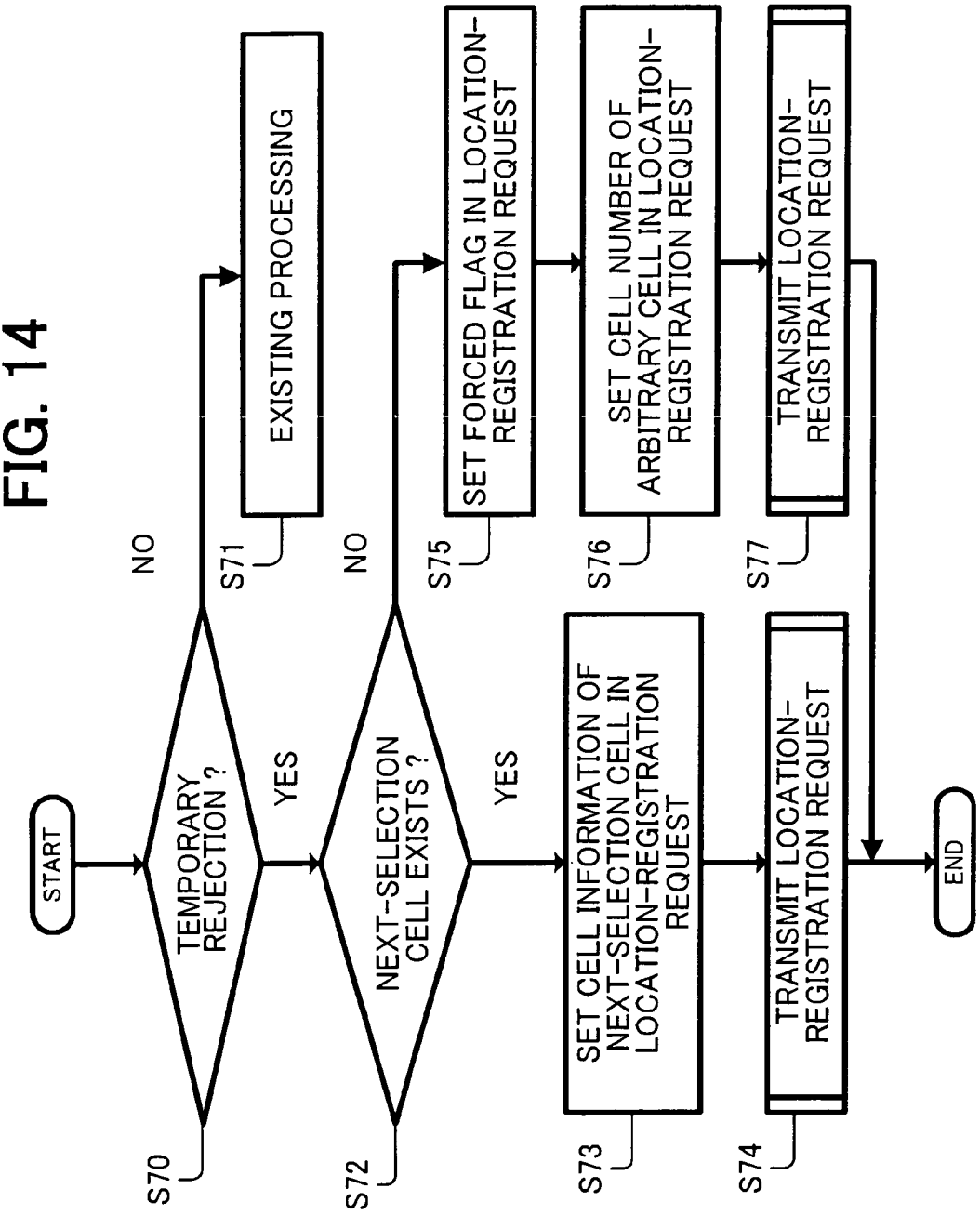
FIG. 14 is a flowchart of re-location-registration-request processing and location-registration-cell-setting processing of a mobile station (MS) according to the embodiment of the present invention.

FIG. 14 is a flowchart of re-location-registration-request processing and location-registration-cell-setting processing of a mobile station (MS) according to the embodiment of the present invention.

In FIG. 14, the re-location-registration-request function 21 determines whether or not the cause information of the received location-registration response indicates "temporary rejection", at step S70. If the cause information does not indicate "temporary rejection", the re-location-registration-request function 21 performs normal processing, that is, the location-registration processing, at step S71.

If the cause information indicates "temporary rejection", it is determined whether or not the next selection cell (a cell that has a reception radio wave which is second in the reception-radio-wave intensity after the temporarily rejected cell and that is not temporarily rejected) exists, at step S72. If the next selection cell exists, the cell number of the next selection cell is set in the location-registration request, as cell information, at step S73, and the location-registration request is transmitted, at step S74. The above-described step S73 corresponds to step S7 shown in FIG. 8C.

If the next selection cell does not exists, the forced-location-registration-cell-setting function 22 sets a forced flag, which is information indicating to the visitor-location register (VLR) that location registration of the mobile station (MS) should be done by force, at step S75, sets the cell number of an arbitrary cell that can receive a radio wave in the location-registration request, as the cell information, at step S76, and transmits the location-registration request, at step S77. The above-described steps S75 and S76 correspond to step S8 shown in FIG. 8C.

When the location-registration request is transmitted to the MSC 13a, the location-registration-new-information-setting function 25 of the MSC 13a performs the location-registration-new-information-setting processing, at step S9 shown in FIG. 8C. The location-registration-new-information-setting processing is illustrated in FIG. 11.

Upon receiving the location-registration request transmitted from the MSC 13a, the VLR 14 determines whether or not the location-registration request includes the forced flag, which means forcing location registration, at step S10 shown in FIG. 8D. If the location-registration request includes the forced flag, the in-area-subscriber-setting function 33 performs the in-area-subscriber-setting processing, at step S11 in FIG. 8D, and the in-area-subscriber-thinning-out function 32 performs the in-area-subscriber-thinning-out processing, at step S12 in FIG. 8D.

FIG. 15 is a flowchart of in-area-subscriber-setting processing of a visitor-location register (VLR) according to the embodiment of the present invention.

In FIG. 15, the cell-to-RNC-conversion table 35 is searched based on the cell number of cell information retrieved from the location-registration request and the RNC number corresponding to the cell number is acquired, at step S80. Further, the RNC-to-MSC-conversion table 36 is searched based on the RNC number and the MSC number corresponding to the RNC number is acquired, at step S81.

Further, the in-area-subscriber-registration table 34 is searched based on the RNC number and the MSC number that are acquired by searching the above-described cell-to-RNC-conversion table 35 and RNC-to-MSC-conversion table 36, at step S82, location registration is performed according to the transmitted location-registration request and the location-registration response is transmitted to the MS 10a, at step S83, the location-registration number of each of the MSC table 20a and the RNC table 20b of the in-area-subscriber-registration table 34 is updated, and the MS table 20c is updated, at step S84, to finish the processing.

Figure 16B:
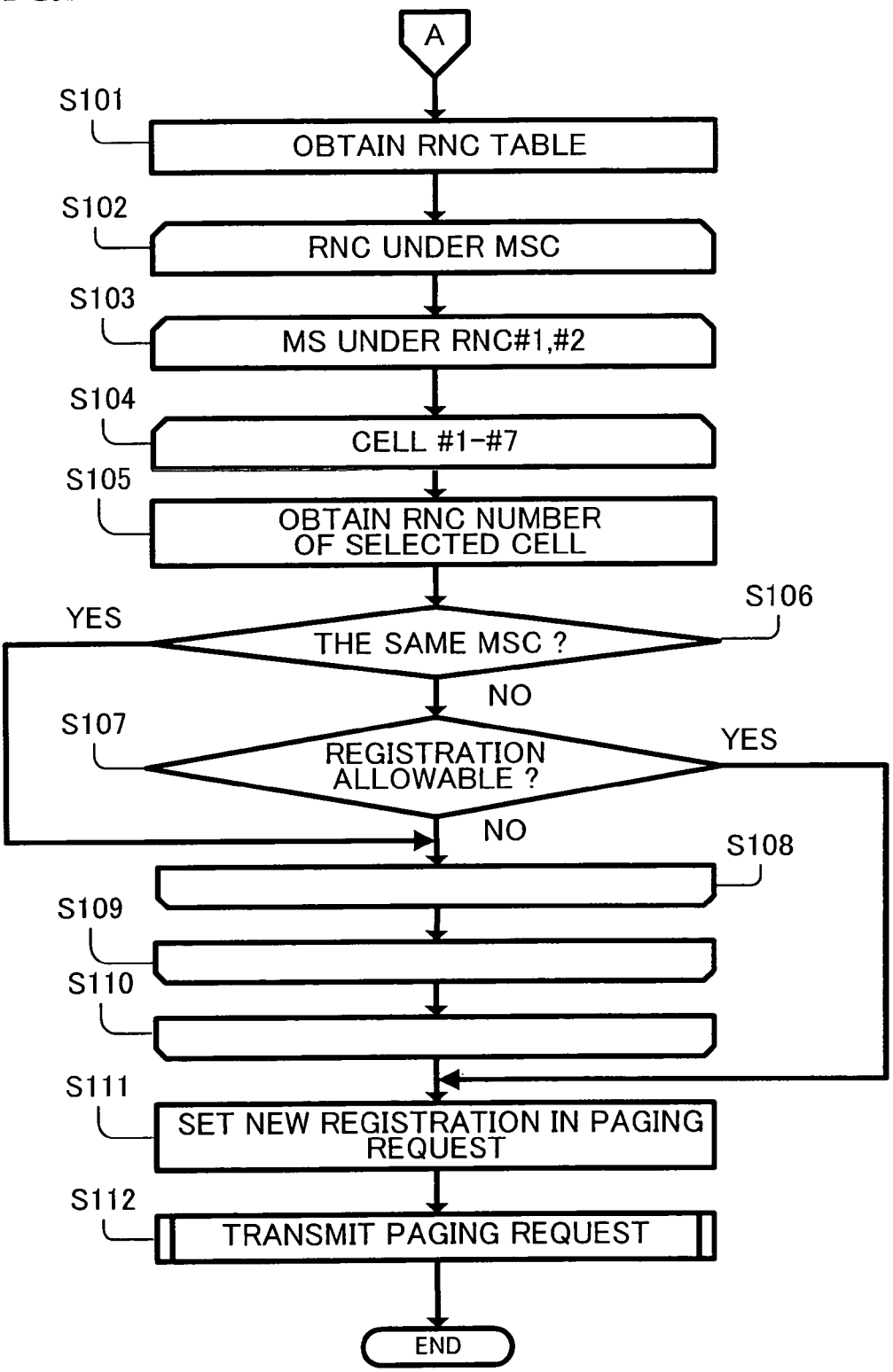

FIGS. 16A to 16B are a flowchart of in-area-subscriber-thinning-out processing of a visitor-location register (VLR) according to the embodiment of the present invention.

In FIG. 16A, at step S90, the in-area-subscriber-registration table 34 is searched based on the MSC number acquired by performing the processing shown in FIG. 15, and it is determined whether or not the location-registration number of the MSC corresponding to the MSC number acquired is smaller than the location-registration-allowable number. Namely, it is determined whether or not being located in a controlled area of the MSC is allowed.

If being located in a controlled area is allowed in the MSC, the processing advances to step S91, so as to search for an RNC which can thin out in-area subscribers of the MSC. At step S91, the in-area-subscriber-registration table 34 is searched based on the RNC number and MSC number corresponding to an MS that made a request for the forced-location registration, where the RNC number and the MSC number are acquired through the processing shown in FIG. 15, and the applicable MS table 20c is acquired.

Here, FIG. 2 shows the MS 10a that is located in cells #4, #5, #6, and #7 which are controlled by the RNC 12b, and that performs the forced-location registration, as a model.

The loop of steps S92, S93, S94, S95, S96, S97, and S98 is performed for each of MSs located in a controlled area of the RNC 12b, and the loop of steps S93 to S97 is performed for each of MSs located in the cells #4, #5, #6, and #7.

At step S94, one of cell numbers of the cells #4, #5, #6, and #7 where the MS 10a that performed the forced-location registration is located is selected, the RNC number is read by searching the cell-to-RNC-conversion table 35 shown in FIG. 7A based on the selected cell number. At step S95, it is determined whether or not the read RNC number is equivalent to the RNC number (#2) corresponding to the MS that made a request for the forced-location registration.

Here, if the RNC number acquired by searching the cell-to-RNC-conversion table 35 shown in FIG. 7A based on the cell numbers is #1 and #3, the answer to the processing performed at step S95 is NO. If the RNC number is #2, the answer to the processing performed at step S95 is YES. If the read RNC number is equivalent to the RNC number (#2), the processing advances to step S97.

If the read RNC number is not equivalent to the RNC number (#2), the RNC table 20*b* shown in FIG. 6 is searched based on the RNC numbers (#1 and #3) acquired by searching the cell-to-RNC-conversion table 35 shown in FIG. 7A, and it is determined whether or not being located in a controlled area is allowed based on the location-registration-allowable number and the location-registration number of the corresponding RNC, at step S96. Here, if the location-registration-allowable number is larger than the location-registration number, being located in a controlled area is allowed. If being located in a controlled area is not allowed, the processing advances to step S97, and if being located in a controlled area is allowed, the processing advances to step S99.

At step S99, one of MSs located in the cell corresponding to the selected cell number (other than the MS 10*a* that made the request for the forced-location registration) is selected, and "new registration" is set in cause information of a paging request, so as to thin out the selected MS. At step S100, the paging request including the cause information of "new registration" is transmitted to the selected MS.

Here, the above-described paging request is transmitted from the VLR 14 to the MS 10*a*, and subjected to protocol conversion in the MSC 13*a* provided between the VLR 14 and the MS 10*a*, though not shown in FIG. 8D. FIG. 12B shows the cause information of the paging request transmitted and/or received between the VLR and the MSC, and FIG. 12C shows the cause information of the paging request transmitted and/or received between the MSC and the MS. The above-described "new registration" is newly set according to an embodiment of the present invention.

On the other hand, if being located in a controlled area is not allowed in the MSC, at step S90, the processing advances to step S101, so as to search for an MSC which can thin out the in-area subscriber of an MSC other than the above-described MSC. At step S101, the in-area-subscriber-registration table 34 is searched based on the MSC number corresponding to the MS that made the request for the forced-location registration, where the MSC number is acquired through the processing shown in FIG. 15, and an applicable RNC table is obtained.

Here, FIG. 2 shows the MS 10*b* that is located in cells #1, #2, #3, #4, #5, #6, and #7 which are controlled by the MSCs 13*a* and 13*b*, and that performs the forced-location registration, as a model.

The loop of steps S102, S103, S104, S105, S106, S107, S108, S109, and S110 is performed for each of RNCs 12*a*, 12*b*, and 12*c* that are placed under the control of the MSCs 13*a* and 13*b*, the loop of steps S103 to S109 is performed for each of MSs located in a controlled area of the RNCs 12*a* to 12*c*, and the loop of steps S104 to S108 is performed for each of the cells #1 to #7.

At step S105, one of the cell numbers of the cells #1 to #7 where the MS 10*b* that performed the forced-location registration is located is selected, and the cell-to-RNC-conversion table 35 shown in FIG. 7A and the RNC-to-MSC-conversion table 36 shown in FIG. 7B are searched based on the selected cell number, so as to obtain the MSC number. Further, at step S106, it is determined whether or not the obtained MSC number is equivalent to the MSC number (#1) of the MS 10*b* that made the request for the forced-location registration.

Here, if the MSC number acquired by searching the cell-to-RNC-conversion table 35 shown in FIG. 7A and the RNC-to-MSC-conversion table 36 shown in FIG. 7B based on the cell numbers is #1, the answer is YES. If the MSC number is #2, the answer is NO. If the MSC number is equivalent to the MSC number (#1), the processing advances to step S108.

If the MSC number is not equivalent to the MSC number (#1), the MSC table 20*a* shown in FIG. 6 is searched based on the MSC number (#2) acquired by searching the cell-to-RNC-conversion table 35 shown in FIG. 7A and the RNC-to-MSC-conversion table 36 shown in FIG. 7B, and it is determined whether or not being located in the MSC is allowed based on the location-registration-allowable number and the location-registration number of the corresponding MSC, at step S107. Here, if the location-registration-allowable number is larger than the location-registration number, being located in a controlled area of the MSC is allowed. If being located in a controlled area of the MSC is not allowed, the processing advances to step S108, and if being located in a controlled area of the MSC is allowed, the processing advances to step S111.

At step S111, one of MSs located in the cell corresponding to the selected cell number selected at step S104, (other than the MS 10*b* that made the request for the forced-location registration) is selected, and "new registration" is set in the cause information of a paging request, so as to thin out the selected MS. At step S112, the cause information is transmitted to the MS selected above.

Here, the above-described paging request is transmitted from the VLR 14 to the MS 10*a*, and subjected to protocol conversion in the MSC 13*a* provided between the VLR 14 and the MS 10*a*, though not shown in FIG. 8D. FIG. 13B shows the cause information of the paging request transmitted and/or received between the VLR and the MSC, and FIG. 13C shows the cause information of the paging request transmitted and/or received between the MSC and the MS.

Upon receiving the above-described paging request transmitted from the VLR 14, the MS determines whether or not the cause information of the paging request indicates "new registration", at step S13 shown in FIG. 8D. If the cause information indicates "new registration", a new-paging function 23 performs new-paging-request processing, at step S14, and the location-registration-cell-setting function 20 performs the location-registration-cell-setting processing, at step S15.

Figure 17:
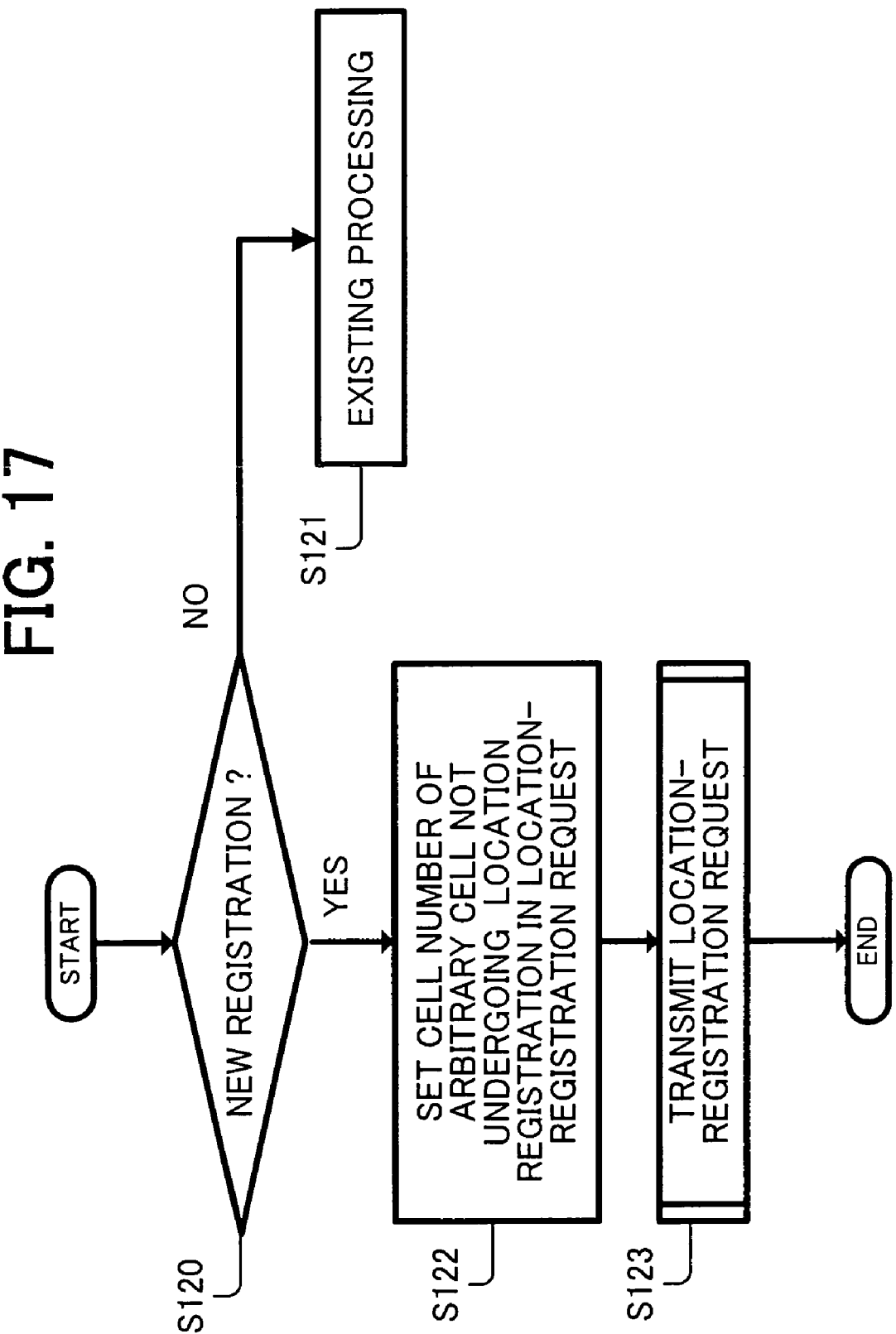
FIG. 17 is a flowchart of new-paging-request processing of a mobile station (MS) according to the embodiment of the present invention.

FIG. 17 is a flowchart of new-paging-request processing of a mobile station (MS) according to the embodiment of the present invention.

In FIG. 17, it is determined whether or not the cause information of the received paging request indicates "new registration", at step S120. If the cause information does not indicate "new registration", existing processing, that is, paging processing is performed, at step S121.

If the cause information indicates "new registration", by receiving cell information from a BTS, an arbitrary cell other than a cell for which location registration is currently done is selected from among cells for which location registration can be done, and the number of the selected cell is set in a location-registration request, as the cell information, at step S122. Then, the location-registration request is transmitted, at step S123.

The location-registration-cell-setting processing performed at step S15 in FIG. 8D is illustrated in FIG. 9. For example, if the MS 10*b* that received the above-described paging request transmitted from the VLR 14 selects the cell #7, cell information (cell number #7) is set in a location-registration request transmitted, at step S15 in FIG. 8D, and the location-registration request is transmitted to the MSC 13*b* via the BTS 11*d* and the RNC 12*c*. The MSC 13*b* performs the location-registration-new-information-setting processing shown in FIG. 11, at step S16 in FIG. 8D.

Thus, when the location-registration request is transmitted from the MS, it is determined whether or not being located in a controlled area is allowed for each of the MSCs and the RNCs. If being located in a controlled area of one of the RNCs is not allowed, re-location registration is performed for a cell placed under control of the other RNC. Further, if being located in a controlled area of one of the MSCs is not allowed, re-location registration is performed for a cell placed under control of the other MSC. If it is difficult to perform the re-location registration, forced-location registration is performed so that the location of a different MS is registered with a different cell. Subsequently, it becomes possible to decrease the state where originating calls are made with difficulty when subscribers are concentrated in a predetermined area.

Accordingly, in-area subscribers are equally provided in each of cells so that the concentration of originating calls in a predetermined area is avoided. Further, when investing in an RNC and exchanges including an MSC, etc., a large-scale facility ready for the concentration of accesses from subscribers in a predetermined area is not required. Therefore, the investment can be decreased.

What is claimed is:

1. A method for registering a location of a mobile station (MS) in a mobile-communication system including a base-transceiver station (BTS), a visitor-location register (VLR), and controllers for controlling the mobile station (MS), the controllers including at least one mobile-switching center (MSC) each controlling at least one radio-network controller (RNC), the method comprising:
    providing the visitor-location register (VLR) with an in-area-subscriber-registration table including a location-registration number of the controllers, a location-registration-allowable number of the controllers, and cell information of the mobile station (MS), the location-registration number being the number of mobile stations which the controllers are currently controlling, the location-registration-allowable number being the number of mobile stations allowable for the controllers to control, the cell information of the mobile station (MS) including a cell number of a cell in which the mobile station (MS) is located;
    receiving, by the visitor-location register (VLR), from a mobile station (MS), a location-registration request including cell information received from a radio wave transmitted from the base-transceiver station (BTS);
    determining, by the visitor-location register (VLR), whether or not the mobile station (MS) is allowed to be located in a controlled area of the controllers, on the basis of the location-registration number of the controller, the location-registration-allowable number of the controller, and the cell information of the mobile station (MS);
    updating, by the visitor-location register (VLR), the location-registration number of the controllers and the cell information of the mobile station (MS) when the first mobile station (MS) is allowed to be located in a controlled area of the controllers;
    transmitting, by the visitor-location register (VLR), to the mobile station (MS), a location registration response indicating temporary rejection of a cell indicated by the cell information included in the location-registration request, when the mobile station (MS) is not allowed to be located in a controlled area of the controllers; and
    receiving, by the visitor-location register (VLR), from the mobile station (MS), a location-registration request including cell information of a next-selection cell which is a cell that is not temporarily rejected by the visitor-location register (VLR) and has a reception radio wave with high intensity second to the temporarily rejected cell.

2. The method of claim 1, further comprising:
    receiving, by the visitor-location register (VLR), from another mobile station (MS), a location-registration request including a forced flag and cell information of a cell corresponding an arbitrary base-transceiver station (BTS) from which the mobile station (MS) is able to receive a radio wave, when the next-selection cell does not exist, the forced flag indicating to the visitor-location register (VLR) that location registration of the mobile station (MS) should be done by force;
    updating, by the visitor-location register (VLR), the location-registration number of the controllers and cell information of the mobile station (MS) upon receiving the location-registration request including the forced flag with ON value;
    transmitting, by the visitor-location register (VLR), a paging request indicating new registration to another mobile station (MS) locating in the same cell as the mobile station (MS), so that
    the another mobile station (MS) selects an arbitrary cell other than a cell for which location registration is currently done, from among cells for which location registration can be done, upon receiving the paging request indicating new registration from the visitor-location register (VLR); and
    receiving, by the visitor-location register (VLR), from the another mobile station (MS), a location-registration request including cell information of the selected arbitrary cell.

3. A mobile station (MS) arranged in a mobile-communication system, comprising:
    means for receiving cell information from a radio wave transmitted from a base-transceiver station (BTS) arranged in the mobile-communication system, the cell information including a cell number of the radio wave;
    location-registration-request means for transmitting a location-registration request including the cell information received from the radio wave transmitted from the base-transceiver station (BTS) to a visitor-location register (VLR) arranged in the mobile-communication system;
    re-location-registration-request means for transmitting a location-registration request including cell information received from a next-selection cell which is a cell that is not temporarily rejected by the visitor-location register (VLR) and has a reception radio wave with high intensity second to the temporarily rejected cell; and
    forced-location-registration-cell-setting means for transmitting a location-registration request including a forced flag and cell information of a cell corresponding to an arbitrary cell from which the mobile station (MS) is able to receive a radio wave, when the next-selection cell does not exist, the forced flag indicating to the visitor-location register (VLR) that location registration of the mobile station (MS) should be done by force.

4. The mobile station of claim 3, further comprising:

new-paging means for transmitting a location-registration request including cell information of the arbitrary cell to the visitor-location register (VLR), upon receiving the paging request indicating new registration from the visitor-location register (VLR).

5. A mobile-communication system, comprising:

a mobile station (MS);

controllers for controlling the mobile station (MS), the controllers including at least one mobile-switching center (MSC) each controlling at least one radio-network controller (RNC); and a visitor-location register (VLR) for registering a location of the mobile station (MS), wherein the visitor-location register (VLR) comprises:

an in-area-subscriber-registration table including a location-registration number of the controllers, a location-registration-allowable number of the controllers, and cell information of the mobile station (MS), the location-registration number being the number of mobile stations which the controllers are currently controlling, the location-registration-allowable number being the number of mobile stations allowable for the controllers to control, the cell information of the mobile station (MS) including a cell number of a cell in which the mobile station (MS) is located;

node-capability-determination means for determining whether or not the mobile station is allowed to be located in a controlled area of the controllers, on the basis of the location-registration number of the controllers, the location-registration-allowable number of the controllers, and the cell information of the mobile station (MS);

updating means for updating the location-registration number of the controller and cell information of the mobile station (MS) upon receiving the location-registration request including a forced flag with ON value indicating that a location registration of the mobile station (MS) should be done by force; and means for transmitting, to the mobile station (MS), a location registration response indicating temporary rejection of a cell indicated by the cell information included in the location-registration request, when the mobile station (MS) is not allowed to be located in a controlled area of the controllers, wherein the mobile-switching center (MSC) receives the location-registration request including cell information and/or the forced flag from the mobile station (MS), reconfigures the cell information and/or the forced flag included in the location-registration request, and transmits, to the visitor-location register (VLR), the location-registration request including the reconfigured cell information and/or the reconfigured forced flag.

6. The system of claim 5, wherein the visitor-location register (VLR) further comprises:

means for updating the location-registration number of the controllers and cell information of the mobile station (MS) upon receiving the location-registration request including the forced flag; and means for transmitting a paging request indicating new registration to another mobile station locating in the same cell as the mobile station (MS) which has transmitted the location-registration request including the forced flag.

* * * * *